(12) United States Patent
Paxson

(10) Patent No.: US 8,689,134 B2
(45) Date of Patent: Apr. 1, 2014

(54) APPARATUS AND METHOD FOR DISPLAY NAVIGATION

(76) Inventor: Dana W. Paxson, Rochester, NY (US)

( * ) Notice: Subject to any disclaimer, the term of this patent is extended or adjusted under 35 U.S.C. 154(b) by 224 days.

(21) Appl. No.: 13/053,940

(22) Filed: Mar. 22, 2011

(65) Prior Publication Data

US 2011/0173562 A1     Jul. 14, 2011

Related U.S. Application Data

(63) Continuation-in-part of application No. 12/924,779, filed on Oct. 5, 2010, which is a continuation of application No. 11/361,439, filed on Feb. 24, 2006, now Pat. No. 7,810,021, application No. 13/053,940, which is a continuation-in-part of application No. 11/828,238, filed on Jul. 25, 2007, now Pat. No. 8,010,897, and a continuation-in-part of application No. 11/828,083, filed on Jul. 25, 2007, now Pat. No. 8,091,017, and a continuation-in-part of application No. 11/828,010, filed on Jul. 25, 2007, now abandoned, and a continuation-in-part of application No. 11/782,976, filed on Jul. 25, 2007, now Pat. No. 7,555,138.

(60) Provisional application No. 60/833,201, filed on Jul. 25, 2006, provisional application No. 60/909,197, filed on Mar. 30, 2007.

(30) Foreign Application Priority Data

Feb. 26, 2007    (WO) ................ PCT/US2007/062801

(51) Int. Cl.
*G06F 3/048*      (2013.01)

(52) U.S. Cl.
USPC ............ 715/790; 715/781; 715/796; 715/802

(58) Field of Classification Search
USPC .................... 715/781, 796, 790, 802
See application file for complete search history.

(56) References Cited

U.S. PATENT DOCUMENTS

| | | | |
|---|---|---|---|
| 5,343,239 A | | 8/1994 | Lappington |
| 5,485,174 A | * | 1/1996 | Henshaw et al. .............. 345/684 |
| 5,699,082 A | * | 12/1997 | Marks et al. ................... 345/157 |
| 5,745,360 A | | 4/1998 | Leone |

(Continued)

FOREIGN PATENT DOCUMENTS

JP      2002086964      3/2002

OTHER PUBLICATIONS

York et al., "Human-computer interaction issues for mobile computing in a variable work context," Google 2004, pp. 771-797.

(Continued)

*Primary Examiner* — Daeho Song
(74) *Attorney, Agent, or Firm* — Christensen O'Connor Johnson Kindness PLLC

(57) ABSTRACT

A method for facilitating window navigation on an electronic display including the steps of rendering at least one elongated strip on opposing sides of a first window wherein the strips are selectable by a user through a user interface device, associating at least one strip with a second window and at least one strip with a third window wherein the strips are each configured to transition one of the second and third windows to the forefront of the electronic display upon selection of the respective strip by the user through the user interface device.

32 Claims, 26 Drawing Sheets

(56) References Cited

U.S. PATENT DOCUMENTS

| | | | |
|---|---|---|---|
| 5,794,257 A | 8/1998 | Liu | |
| 5,809,317 A | 9/1998 | Kogan | |
| 5,887,171 A | 3/1999 | Tada | |
| 5,901,332 A | 5/1999 | Gephardt | |
| 6,125,385 A | 9/2000 | Wies | |
| 6,236,994 B1 | 5/2001 | Swartz | |
| 6,314,415 B1 | 11/2001 | Mukherjee | |
| 6,331,867 B1 | 12/2001 | Eberhard | |
| 6,356,287 B1 | 3/2002 | Ruberry | |
| 6,453,329 B1 | 9/2002 | Dodgen | |
| 6,585,776 B1 | 7/2003 | Bates | |
| 6,684,369 B1 | 1/2004 | Bernardo | |
| 6,766,362 B1 | 7/2004 | Miyasaka | |
| 6,772,139 B1 | 8/2004 | Smith, III | |
| 6,928,623 B1* | 8/2005 | Sibert | 715/783 |
| 6,966,029 B1 | 11/2005 | Ahern | |
| 6,968,455 B2 | 11/2005 | Okayasu | |
| 7,146,573 B2* | 12/2006 | Brown et al. | 715/802 |
| 7,171,618 B2 | 1/2007 | Harrington | |
| 7,240,209 B2 | 7/2007 | Carro | |
| 7,290,205 B2 | 10/2007 | Moncsko | |
| 7,426,687 B1 | 9/2008 | Schultz | |
| 7,426,697 B2* | 9/2008 | Holecek et al. | 715/788 |
| 7,496,829 B2* | 2/2009 | Rubin et al. | 715/203 |
| 7,523,413 B2* | 4/2009 | Sims | 715/788 |
| 7,595,810 B2* | 9/2009 | Louch | 345/629 |
| 7,765,473 B2 | 7/2010 | Buckley | |
| 8,245,154 B2* | 8/2012 | Karstens | 715/802 |
| 2001/0039002 A1 | 11/2001 | Delehanty | |
| 2002/0000990 A1 | 1/2002 | Schauser | |
| 2002/0065964 A1 | 5/2002 | Lemke | |
| 2002/0078343 A1 | 6/2002 | Rubin | |
| 2002/0087969 A1 | 7/2002 | Brunheroto | |
| 2002/0091991 A1 | 7/2002 | Castro | |
| 2002/0108109 A1 | 8/2002 | Harris | |
| 2002/0118860 A1 | 8/2002 | Pasqua | |
| 2002/0122066 A1* | 9/2002 | Bates et al. | 345/786 |
| 2002/0133464 A1 | 9/2002 | Ress | |
| 2002/0152245 A1 | 10/2002 | McCaskey | |
| 2002/0178185 A1 | 11/2002 | Kuchinsky | |
| 2002/0184189 A1 | 12/2002 | Hay | |
| 2002/0194300 A1* | 12/2002 | Lin et al. | 709/217 |
| 2003/0014445 A1 | 1/2003 | Formanek | |
| 2003/0078888 A1 | 4/2003 | Lee | |
| 2003/0159566 A1 | 8/2003 | Sater | |
| 2003/0190054 A1 | 10/2003 | Troyansky | |
| 2003/0193524 A1* | 10/2003 | Bates et al. | 345/786 |
| 2004/0091132 A1 | 5/2004 | Eguchi | |
| 2004/0128624 A1 | 7/2004 | Arellano | |
| 2004/0181543 A1 | 9/2004 | Wu | |
| 2004/0199871 A1 | 10/2004 | Lee | |
| 2004/0230327 A1 | 11/2004 | Opheim | |
| 2004/0230457 A1 | 11/2004 | Rosenbloom | |
| 2004/0268230 A1 | 12/2004 | Liu | |
| 2005/0019740 A1 | 1/2005 | Cunningham | |
| 2005/0028098 A1 | 2/2005 | Harrington | |
| 2005/0034056 A1* | 2/2005 | Rubin et al. | 715/500 |
| 2005/0055624 A1 | 3/2005 | Seeman | |
| 2005/0076296 A1 | 4/2005 | Lee | |
| 2005/0108654 A1* | 5/2005 | Gopalraj | 715/791 |
| 2005/0149851 A1 | 7/2005 | Mittal | |
| 2005/0160353 A1* | 7/2005 | Conrad et al. | 715/505 |
| 2005/0229102 A1* | 10/2005 | Watson et al. | 715/739 |
| 2005/0246635 A1 | 11/2005 | Hirose | |
| 2005/0251731 A1 | 11/2005 | Valderas | |
| 2005/0283719 A1 | 12/2005 | Awamoto | |
| 2006/0036940 A1 | 2/2006 | Hsiu-Ping | |
| 2006/0070009 A1* | 3/2006 | Chiu et al. | 715/797 |
| 2006/0075241 A1 | 4/2006 | Deguillaume | |
| 2006/0123107 A1 | 6/2006 | Chen | |
| 2006/0150228 A1 | 7/2006 | Kelly | |
| 2006/0161860 A1* | 7/2006 | Holecek et al. | 715/781 |
| 2006/0173951 A1 | 8/2006 | Arteaga | |
| 2006/0224989 A1* | 10/2006 | Pettiross et al. | 715/779 |
| 2007/0073833 A1 | 3/2007 | Roy | |
| 2007/0087316 A1 | 4/2007 | Arnold | |
| 2007/0101263 A1 | 5/2007 | Bedingfield, Sr. | |
| 2007/0118801 A1 | 5/2007 | Harshbarger | |
| 2007/0136674 A2 | 6/2007 | Schumacher | |
| 2007/0150829 A1 | 6/2007 | Eschbach | |
| 2007/0162878 A1 | 7/2007 | Lee | |
| 2007/0204211 A1 | 8/2007 | Paxson | |
| 2007/0226647 A1* | 9/2007 | Louch | 715/788 |
| 2007/0299914 A1 | 12/2007 | Jones | |
| 2008/0025559 A1 | 1/2008 | Paxson | |
| 2008/0027822 A1 | 1/2008 | Paxson | |
| 2008/0037879 A1 | 2/2008 | Paxson | |
| 2008/0109753 A1* | 5/2008 | Karstens | 715/802 |
| 2008/0141182 A1 | 6/2008 | Barsness | |
| 2008/0189648 A1 | 8/2008 | Anglin | |
| 2008/0193101 A1 | 8/2008 | Agnihotri | |
| 2008/0216022 A1 | 9/2008 | Lorch | |
| 2008/0301074 A1 | 12/2008 | Dozier | |
| 2008/0301698 A1 | 12/2008 | Badaloo | |
| 2009/0150612 A1 | 6/2009 | Cooper | |
| 2010/0306669 A1* | 12/2010 | Della Pasqua | 715/752 |
| 2011/0047152 A1 | 2/2011 | Smith, III | |

OTHER PUBLICATIONS

Sittig et al., "Techniques for identifying the applicability of new information management technologies in the clinical setting: an example focusing on handheld computers," Google 2000, pp. 804-808.

Schmalsteig et al., "Experiences with handheld augmented reality," Google 2007, pp. 1-13.

Schaffer, Michael D. and John-All, Annette, "Electronic circulation of books at hand," Philadelphia Inquirer, business Section, P. D01, May 24, 2000.

Salopek, J. J., " Books, buttons, and beyond," Training & Development, vol. 54, No. 6, pp. 77-78, Jun. 2000.

Reid, C., "E-lit support group formed," Publishers Weekly, vol. 247, No. 32, p. 57, Aug. 7, 2000.

Pearson, S.B., "Heading Into Uncharted Territory? (Updating Marine Navigation Charts)," Cruising World, vol. 25, No. 9, p. 106, Sep. 1999.

Patten et al., "Designing Collaborative Constructionist and Contestual Applications for Handheld Devices," Google 2006, pp. 294-308.

Ojala, M., "The European online scene," Searcher, vol. 4, No. 3, p. 22, Mar. 1996.

Ojala, M., "Reviewing google book search," Online, vol. 30, No. 2, p. 12, Mar.-Apr. 2006.

Marshall et al., "Reading in the small. A study of reading on small form factor devices," ACM 2002, pp. 56-64.

Holzberg, C. S., "Off with their heads!" CD-ROM World, vol. 9, No. 7, pp. 78-79, Jul./Aug. 1994.

Hilts, P. "Dial-a-book: Very direct marketing," Publishers Weekly, vol. 242, No. 6, p. 29, Feb. 6, 1995.

Guinn, J, "So you want to write a book? Here are Tips to get it published," Miami Herald, Broward edition, Living section, p. 5E, Aug. 16, 2001.

Fies et al., "Classroom response systems: A review of the literature," Google, Mar. 2006, pp. 101-109.

Ditlea, S., "The real e-books," Technology Review, Vo.. 103, No. 4, pp. 70-78, Jul.-Aug. 2000.

Cavanaugh, "Ebooks and Accommodations: Is this the future of print accommodations?" Google 2002, pp. 56-61.

Baron, D., "The Madness of Roland: an Ambition, and Difficult, Interactive Novel," Digital Media, vol. 2, No. 10-11, p. 17, Mar. 29, 1993.

Ardito, (Electronic Books: To "E" or not to "E": That is the question, Sarcher vol. 8, No. 4, p. 28, Apr. 2000.

Anon., "Tales that let you" Statesman (India), Nov. 14, 2004.

Anon., "New Stephen King ebooK Exclusive to be available through netLibrary and peanutpress.com," Business Wire, p. 0049, Mar. 8, 2000.

(56) References Cited

OTHER PUBLICATIONS

Anon., "Special TMC Labs Review: Skills-based Routing: Matchmaking and the Call Center, Part II," Call Center Solutions, vol. 18, No. 11, pp. 94-100, May 2000.
Anon., "Database Confidential," Data Based Advisor, vol. 14, No. 10, p. 98, Oct. 1996.
Anon., "Austin, Texas, Startup Transforms Big Publishers' Content for Online Use," Austin American-Statement, Mar. 13, 2000.
Andres, C., "Authoring Software Offers Multiple Choices," MacWeek, vol. 5, No. 22, p. 30, Jun. 11, 1991.
Anon., "The Future of the Printed Word Seems Smudgy," Financial Express, Nov. 12, 2005.
Anon., "InterGO: Industry's First Enriched Internet Software Is Now Available Worldwide," Business Wire, p. 01031195, Jan. 3, 1996.
Anderson, "Applicability of Normal Forms in Hyperlink Database Structure," Google 2000, pp. 1-50.
Barrett, "Create Your Own Electronic Portfolio," Google 2000, pp. 14-21.
Czyzowicz, et al., "Enhancing Hyperlink Structure for Improving Web Performance," Google 2003, pp. 1-28.
Dale et al., "Integrating Natural Language Generation and Hypertext to Produce Dynamic Documents", Google 1998, pp. 109-135.
Weiss et al., HyPursuit: A Hierarchical Network Search Engine That Exploits Content-Link Hypertext Clustering, ACM 1996, pp. 180-193.
International Search Report and Written Opinion in PCT/US07/62801 dated Jun. 3, 2008.

\* cited by examiner

APPARATUS AND METHOD FOR DISPLAY NAVIGATION

CROSS-REFERENCE TO RELATED APPLICATIONS

This application is a continuation-in-part of application Ser. No. 12/924,779, filed Oct. 5, 2010, which is a continuation of application Ser. No. 11/361,439, filed Feb. 24, 2006 (now U.S. Pat. No. 7,810,021). This application is also a continuation-in-part of application Ser. No. 11/828,238, filed Jul. 25, 2007 (now U.S. Pat. No. 8,010,897); application Ser. No. 11/828,083, filed Jul. 25, 2007 (now U.S. Pat. No. 8,091,017); application Ser. No. 11/828,010, filed Jul. 25, 2007 (now abandoned); and application Ser. No. 11/782,976, filed Jul. 25, 2007 (now U.S. Pat. No. 7,555,138), all of which claim the benefit of U.S. Provisional Application No. 60/909,197, filed Mar. 30, 2007, and U.S. Provisional Application No. 60/833,201, filed Jul. 25, 2006. The entire disclosure of each of said applications is hereby incorporated in its entirety by reference herein.

FIELD OF THE INVENTION

The present invention relates to the creation of texts readable on electronic displays, and more specifically to the creation of interconnected narratives and references readable using browser programs such as those adapted for use on the World Wide Web. The invention further relates to selection of texts readable on electronic displays, and more specifically to navigation among multiple display windows using browser programs such as those adapted for use on the World Wide Web.

BACKGROUND OF THE INVENTION

Tools for passing knowledge from an author or originator to a reader are well-known in the realm of electronic literature, and are commonly used to document complex software packages. All such systems have shortcomings. The following discussion outlines both the range of the conventional systems and the shortcomings of each type.

Software and General Documentation

One examplary documentation system is that used in the open-source Python language system. This system operates as a set of interlinked hypertext documents, carefully organized to provide the user of the Python language with rapid and relevant access to information on the uses and characteristics of the language. Another example of such documentation tools is the Wikipedia Web site, a collaborative open-source encyclopedia accessible to all on the World Wide Web. Its pages are intensively interlinked, and interconnected with many other Web locations.

The Wikipedia Web site, and in fact any open-source document system, suffers from the disadvantage of potential unreliability of its content and structure. Any method of reviewing, vetting, and correcting a system of documents relies on a controlling administrative process. The absence, in any formal sense, of such a process for an open-source document system reduces its acceptability as a source of reliable and accurate information.

Many proprietary documentation systems, for example the "Help" pages for a software application, work similarly while eliminating the issues of reliability and accuracy. A key disadvantage to the proprietary documentation systems is their frequent shortfall of coverage and lack of responsiveness in areas needing special attention for users. The open-source documentation systems adapt to such shortfalls quickly, though they usually require cycles of correction.

All such open-source and proprietary documentation systems, as carefully-structured as they are, give readers considerable freedom in choosing paths to take through the content. Such freedom is at once an asset and a liability. If a document system such as Wikipedia or Python's system is used, the reader is offered no appropriate serialization of presentation that would support the orderly acquisition of knowledge. Sequencing of presentation is a necessary component of education and knowledge transfer.

A proprietary publishing system such as that of Microsoft Reader sequences its presentations quite well using a table of contents for a work, along with a set of conventional links forward and backward through a work, but it lacks richness in its use of links. In other products such as Adobe Acrobat, links within a work and among works are easily placed, but there is no systematization of the determination and placement of those links. In nearly every product, a single narrative line is assumed to be the primary means of presentation and assimilation of a work's content.

Conventional Document Authoring Tools

Document authoring tools abound. XML Editors include: syntactical editors such as Stylus Studio, EditML Pro, xmlBlueprint, Xeena, Xerlin, and Cooktop; visual editors such as XMetal, EditiX, Morphon, FrameMaker, and Vex; and text editors such as emacs, VIM, and JEdit. All of these address the detailed structure and appearance of a document but ignore its semantics and the structure of its meaning. Mind mapping tools such as MindManager, PersonalBrain, Inspiration, Visual Mind, ThinkGraph, or FreeMind address the semantics and structure of meaning, but do not offer flowing, readable text in a continuous narrative form. None of these tools address an instructional mode of presentation in a manner straightforward enough for most authors to use.

One exemplary prior art document authoring tool is disclosed in U.S. Pat. No. 6,684,369, entitled "Web site creator using templates", and issued to Bernardo et al. ("Bernardo"). Bernardo provides software tools for simplifying the creation of Web sites, including pre-stored templates containing formatting information, menus and views to guide the user, components to facilitate collaboration among Web site creators, graphical design components, review components, and other elements. Bernardo does not, however, address the dynamic organizing of the content for instructional or other pedagogical purposes suited to different readers, nor does it address the restriction of content so as to maintain the reader's immersion in and focus on the content to the exclusion of external material. Bernardo also does not distinguish between the terms "knowledge base" and "database".

Immersive Reading

Conventional electronic literature makes extensive use of hyperlinks as a means of letting a reader link from one text to another. The reader's freedom in exercising links in the product of a document authoring system offers a constant temptation to stray outside the document to links elsewhere, or to allow the document's visual distractions, including the visible markings indicating its hyperlinks, to interfere with reading. Learning is most effective when it is immersive: the learner, or in this case the reader, gains information best when outside distractions are not allowed to interrupt the engagement with the material being learned. A student of language can attest to this fact. In immersive reading, the reader is so deeply engaged with the contents of the document that the reading experience embraces the widest and deepest ranges of the reader's awareness. Conventional electronic literature makes little or no attempt to establish and maintain the immersive "spell" for the reader. Consequently, the distractions offered by both the World Wide Web and the links within the document itself serve to disrupt the reader's learning process.

Programmed Instruction

An opposite problem also confronts the designer of an electronic learning tool: the overly-restrictive application of rules to the reader's progress through the presented material. This problem first arose with the advent of "programmed instruction", or PI, in which a reader was required to enter a specific answer to a question and then follow a specific series of steps based on that choice. A pioneering example of this technology was the Plato Project in the 1960s.

The authors of such documents found them difficult to program. Making mistakes was easy, and the trivial nature of the lessons being conveyed made the work much like counting grains of sand. Likewise, readers often found such documents trivial and boring, and lost interest in them quickly. Later efforts met with more success, but the conventional approach to specificity and rigidity of requirements have generally made such tools of less interest to authors and readers. They would be of greater interest if their methods were integrated into a more-relaxed framework.

Offering Choices to Readers

The realm of knowledge transfer would be well served by the availability of tools which offer the author a means for ordering one or more sequencings of written material for presentation, and offer the reader a means for following any specific sequence provided by the author. Furthermore, such tools should provide the author with the means to present to readers any supporting material without breaking the immersive state of a reader's mind during the reading.

Different readers, equipped with different cognitive processes and styles of thought, tend to follow different threads of discourse through a body of knowledge. For example, some readers cannot immerse themselves in the conventional temporally sequenced presentation, but are quite comfortable with a traversal of the material through associated themes and ideas, as is done in the works of James Burke. Allowing readers to choose from a wide variety of approaches to threading the body of knowledge in some order would provide a wider range of readers with improved engagement with the knowledge to be assimilated.

Holding the Reader's Attention

Knowledge transfer works better when the means of conveyance acts as a "containment vessel" for the required knowledge, keeping the reader within its bounds to the greatest extent possible. Furthermore, knowledge transfer is enhanced when the author's background material, originating in glosses, references, sidebars, footnotes, and other sources, is integrated smoothly with the sequenced material. This makes the document as a whole capable of "bootstrapping" the reader into a rapid understanding of what might otherwise be an arcane field replete with jargons, notations, and conventions that make ordinary reading a monumentally difficult exercise.

When an author, whether an educator or a writer of fiction or nonfiction, can supply some kind of rule structure to guide readers without frustrating or boring them, the reader's immersion in the material is enhanced and not damaged. Such reader immersion serves the knowledge transfer process in the best possible way.

Moreover, maintaining a reader's attention to a handheld device having a display screen of limited size requires a method and apparatus for easy-to-use reader navigation among multiple windows containing such knowledge as identified above.

Strategy Games

Another realm of knowledge transfer well-known in the art is that of the electronic strategy game. Examples abound: Sid Meier's "Civilization" series of games, the "Galactic Civilizations" set, Microsoft's "Age of Empires" series, and many more. Such games confront a knowledge-intensive problem: teaching new players how to play them. Failure at this task yields poor sales of the games. To profit their makers, the games organize and present their rules, entities, relationships, and dynamics in the best ways they can.

Such organization and presentation methodology are appropriate candidates for use in a more-general knowledge transfer setting. The dearth of such applications in formal education is surprising—to bring about a student's rapid and successful absorption of knowledge would seem to be desirable. A major obstacle seems to be the ease with which an educator can adopt the principles and practices of the game authors. Easing the educator's tasks in preparing new works such as electronic textbooks would open the way to significant improvements in the use of electronic materials, including instructional materials developed using game-learning principles, in formal education.

The Demonstrated Need

In summary, a strong need exists for educational tools and methods which: 1) assure validity and relevance of the material presented, 2) maintain the reader's immersion in the material, 3) focus and guide the reader through orderly sequencings of the material, 4) stimulate the reader with presentations of sufficient scope and interest, 5) support the reader's rapid acquisition of knowledge details, 6) offer the reader more than one choice of sequences of presentation of the material, and 7) facilitate and simplify the work of authors and editors in their efforts to accomplish 1) through 6).

SUMMARY OF THE INVENTION

The present invention provides both author and reader the required toolset, called herein for certain embodiments of the present invention the Knowledge Transfer Tool, or "KTT", to establish, maintain, and enhance the immersive experience of knowledge transfer via a richly-linked and densely-structured portable electronic document, called here an electronic literary macramé, or "ELM", a body of knowledge structured for immersive learning. The KTT combines a graphical author interface, a rule-based expert system, a presentation database of narrative, glossary, reference, and other textual and non-textual materials for reader presentation, a set of structures for the presentation of the materials for readers, a knowledge database containing the relationships among the author's defined presentation materials and the rules for presentation of said materials, an intensive range of linkages among the presentation materials, multiple threads of presentation for choice by readers, a contextual memory of reader preferences and selections, and a presentation system for readers that suppresses distractions from the immersive reading process, thereby facilitating the study and absorption of the presented materials.

In some embodiments, by including one or more selectable strips at the edges of each ELM window display, the ELM can be configured to switch from the window displaying the strips to the window associated with the strip selected by the reader. Accordingly, the positioning of the selectable strips in each ELM window suggests to the reader a natural sequence of window selections based on repeated selection of strips sharing the same relative position in each window.

In embodiments including a handheld computing environment, the present invention enables a learner to store, carry, and undertake an extended educational program in the space of the palm of one hand.

The present invention also offers both client-only and client-server embodiments of its ELM to expand commercial opportunities for publishers.

DRAWINGS OF THE INVENTION

The present invention is disclosed with reference to the accompanying drawings, wherein.

Figure 2:
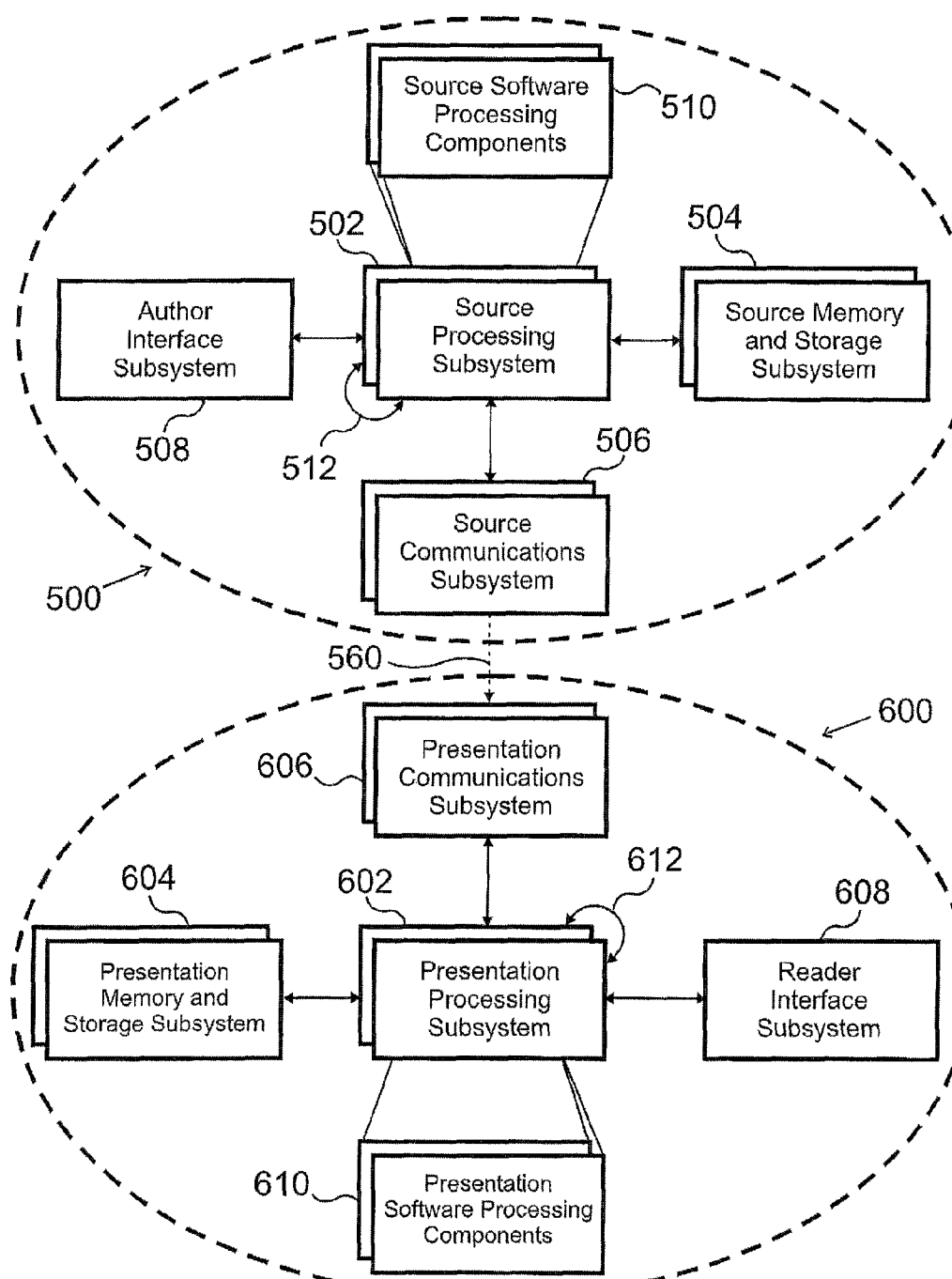
FIG. 2 is a block diagram of exemplary source and presentation computing systems shown in FIG. 1.
Figure 5A:
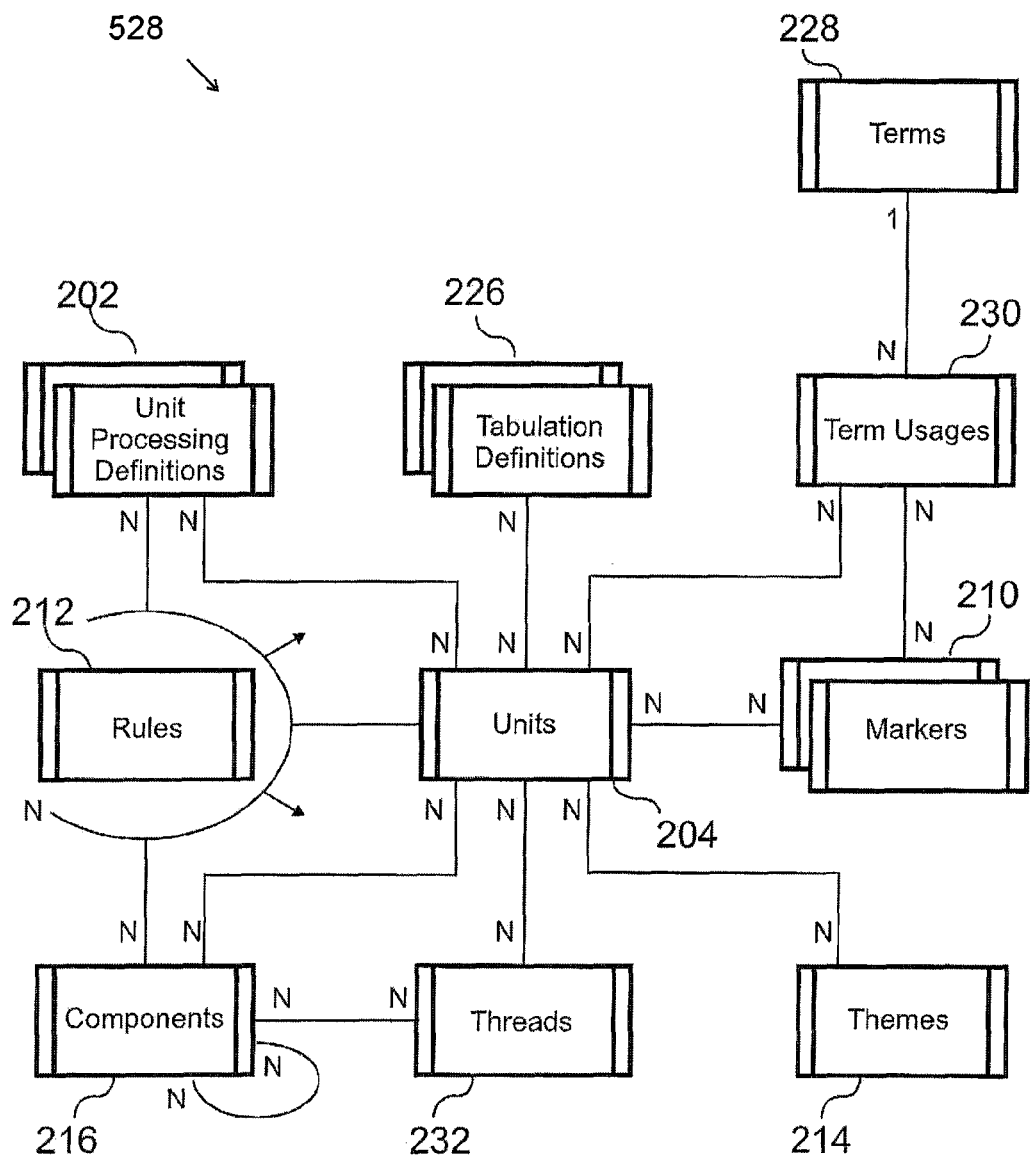
Figure 5B:
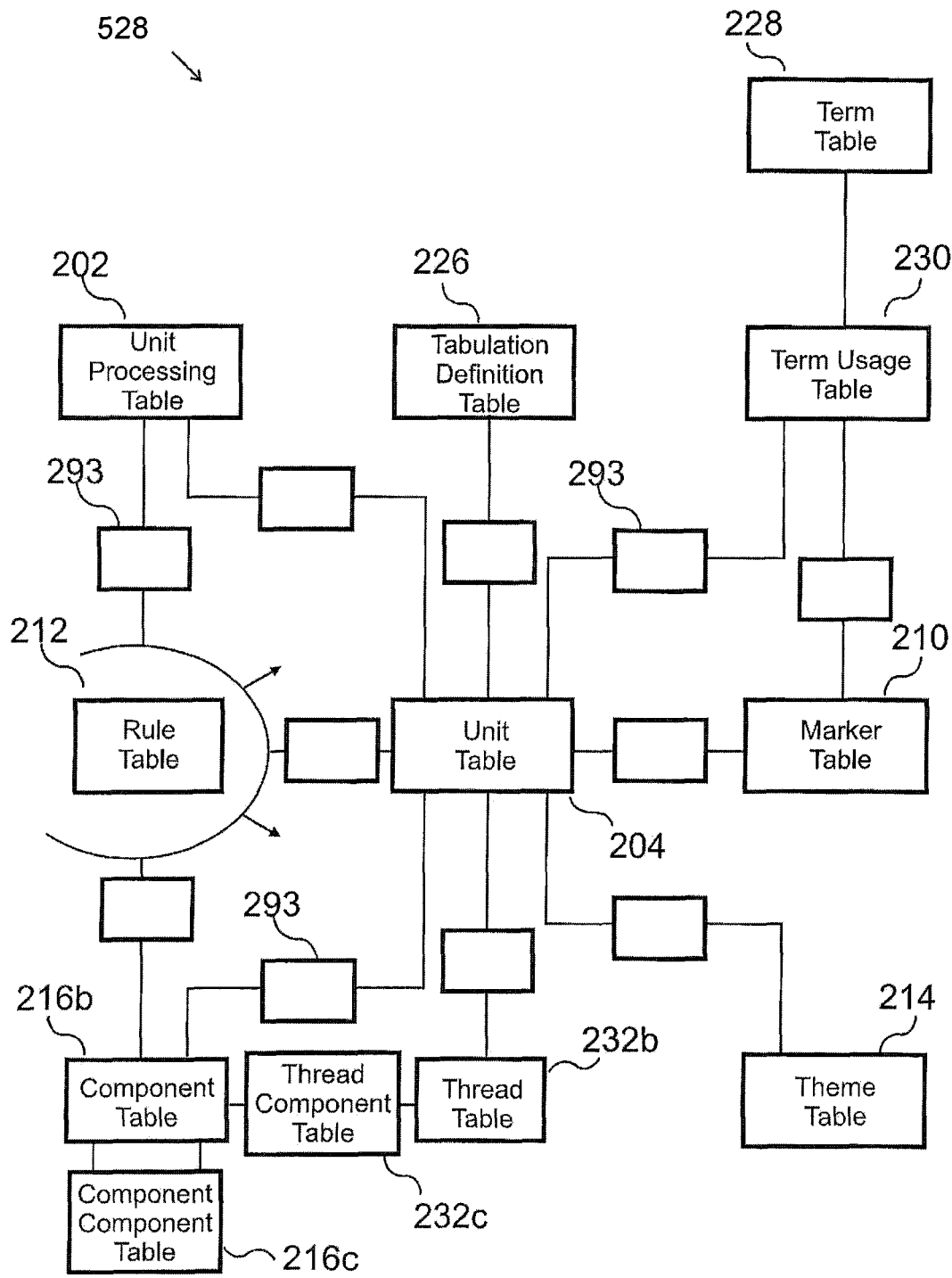
Figure 5C:
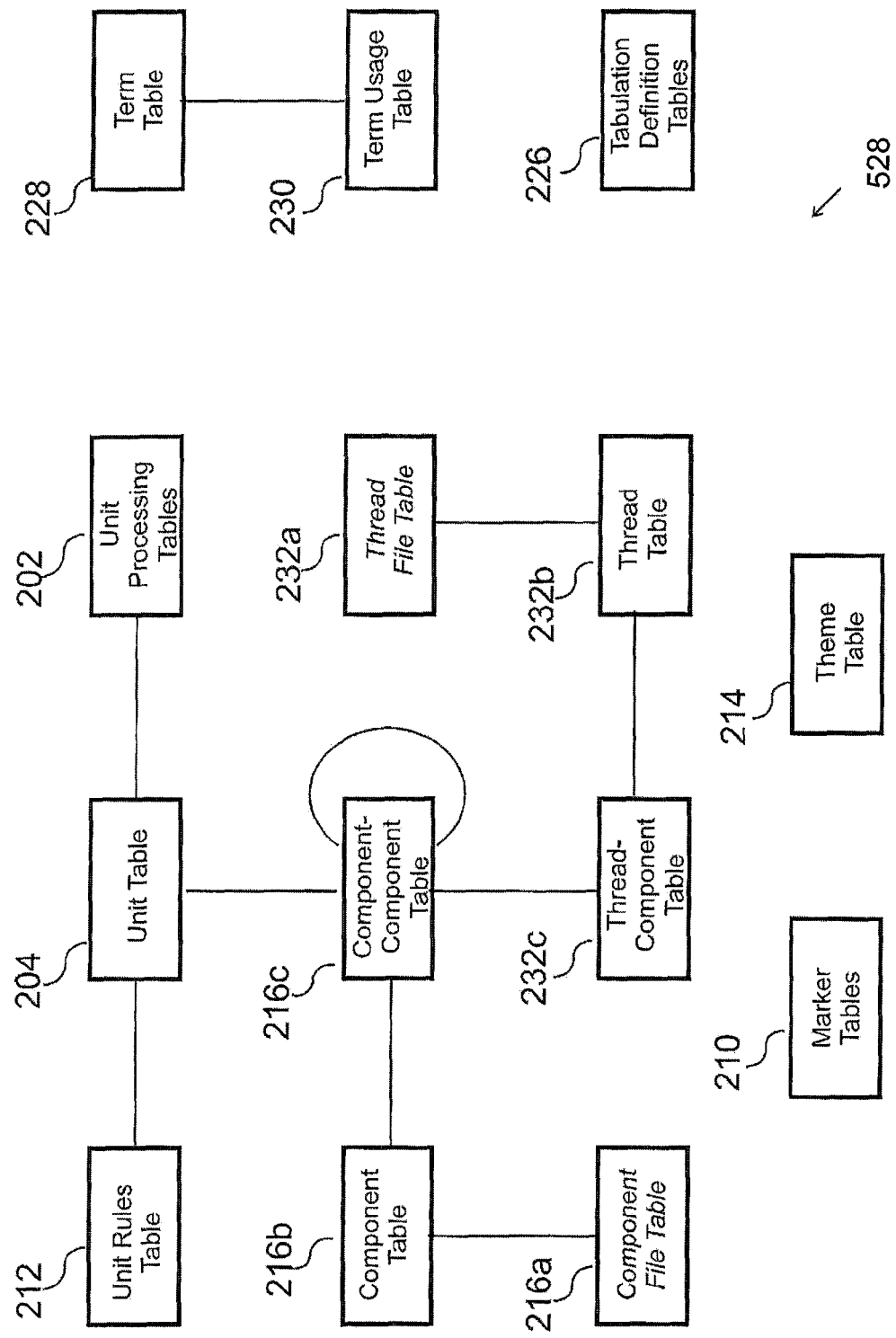
Figure 6:
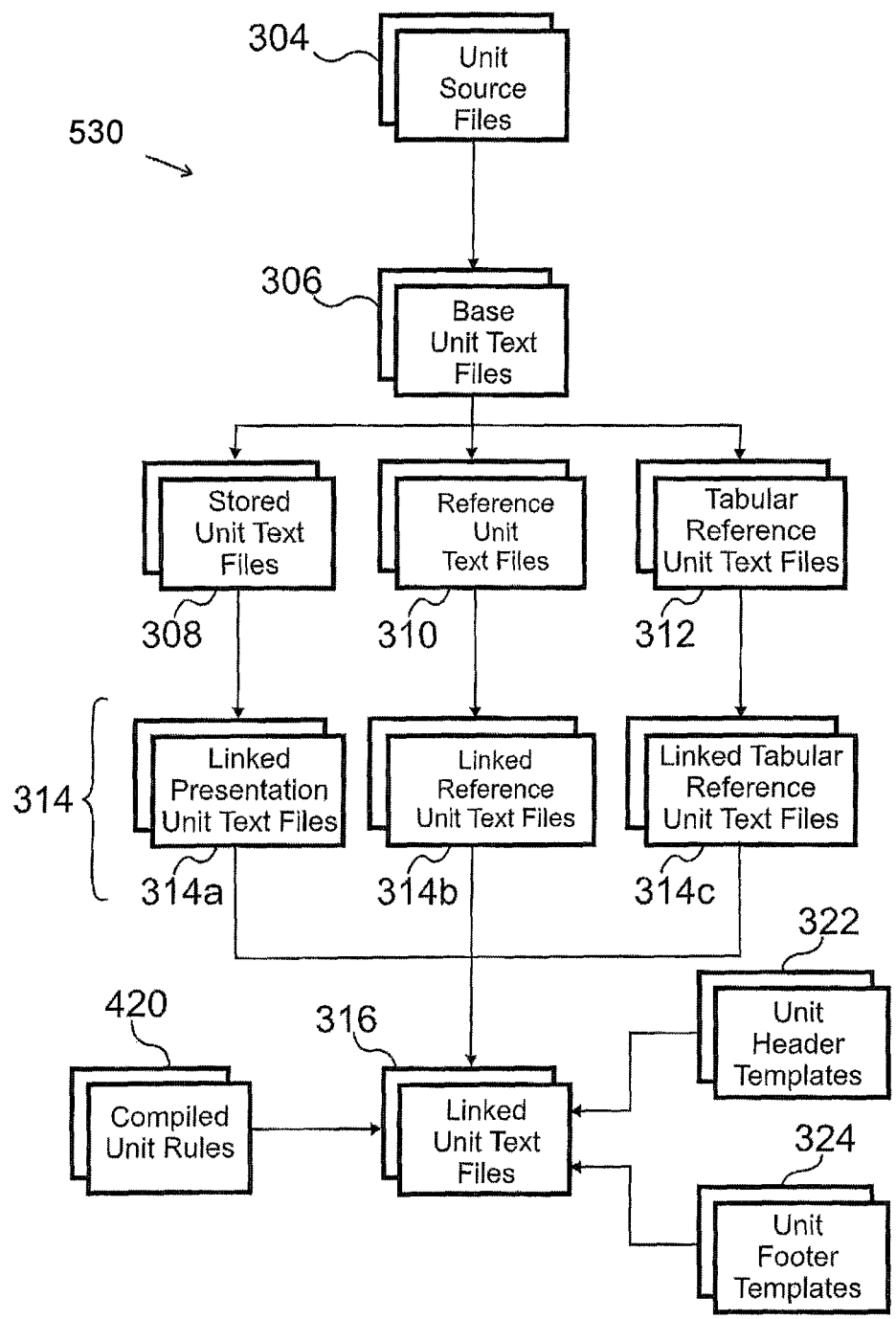
Figure 7:
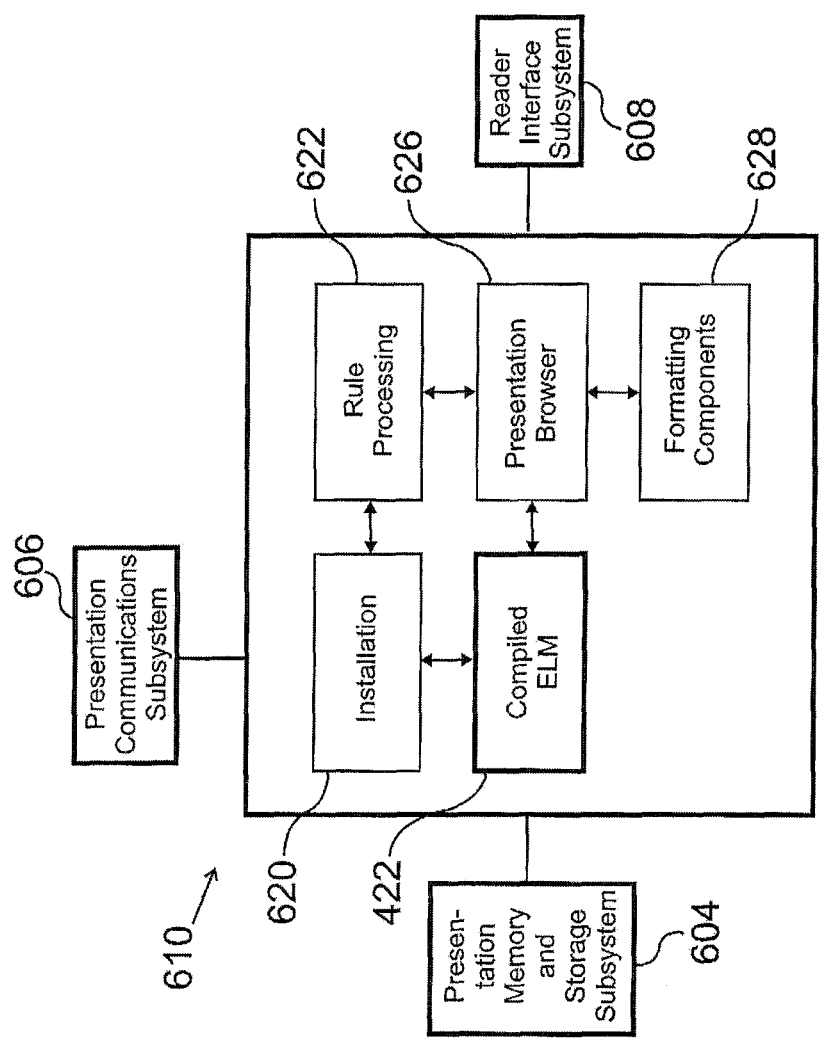
Figure 8:
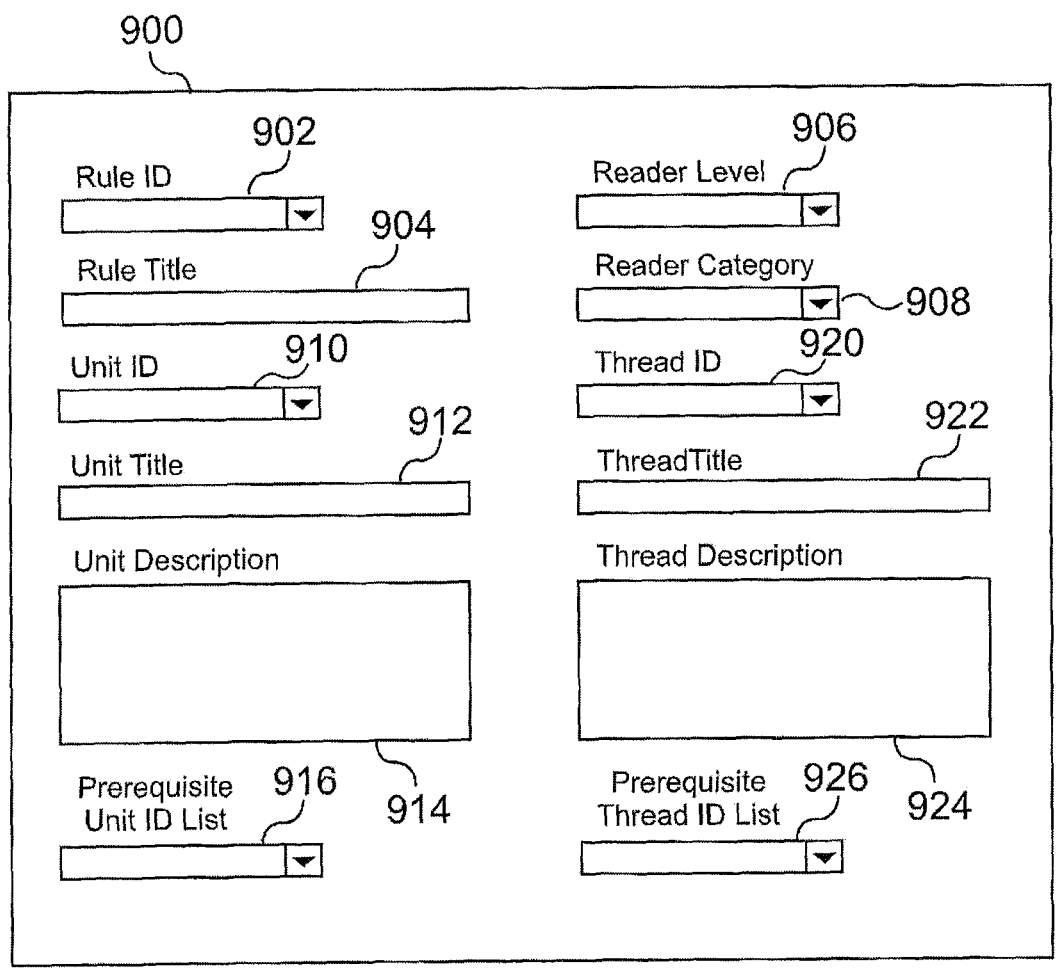
Figure 9:
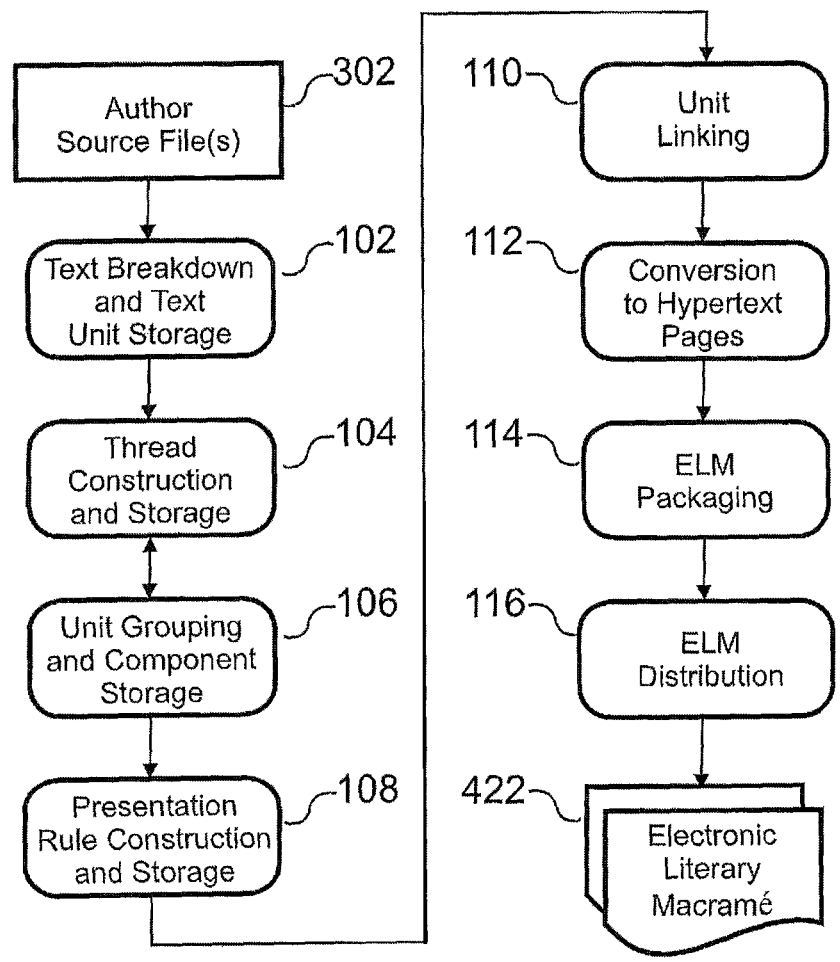
Figure 10:
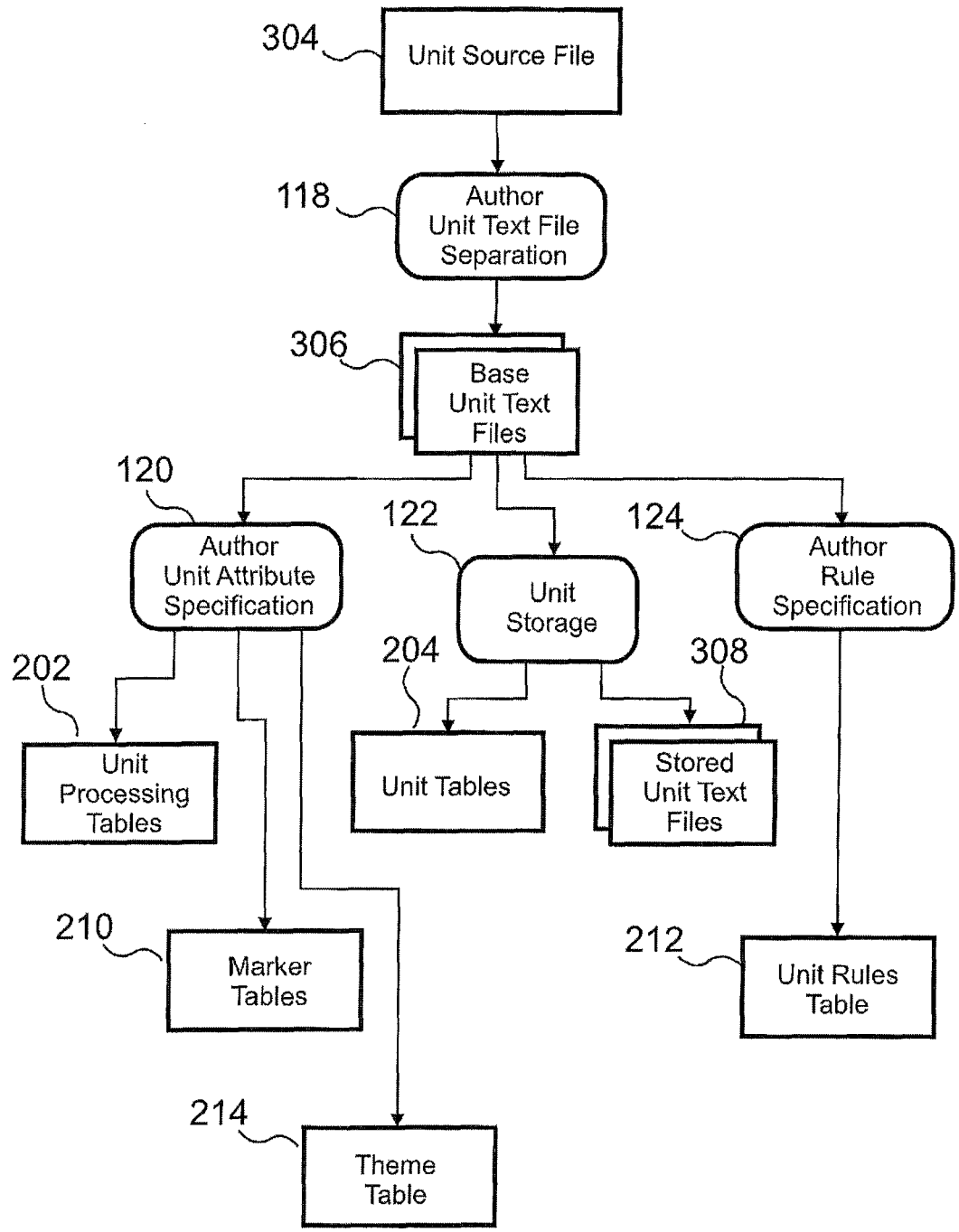
Figure 11:
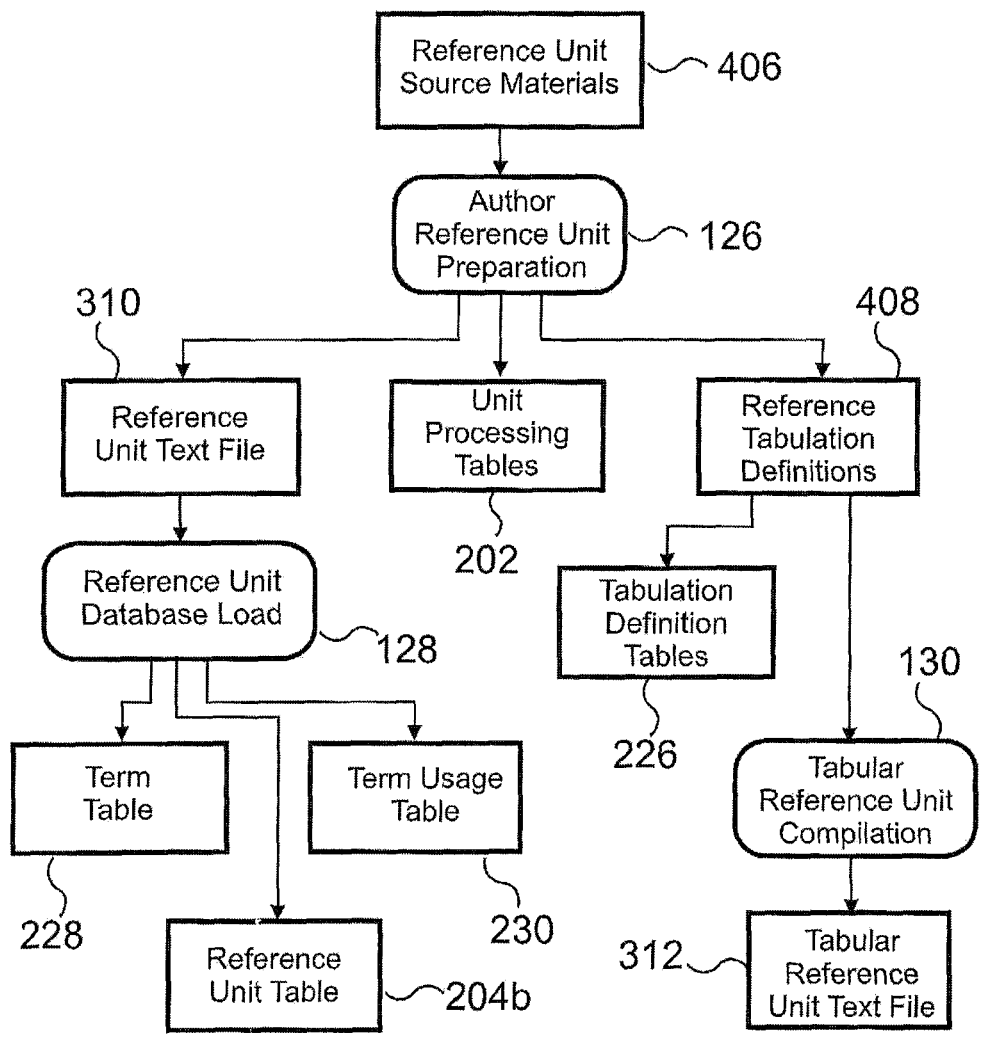
Figure 12:
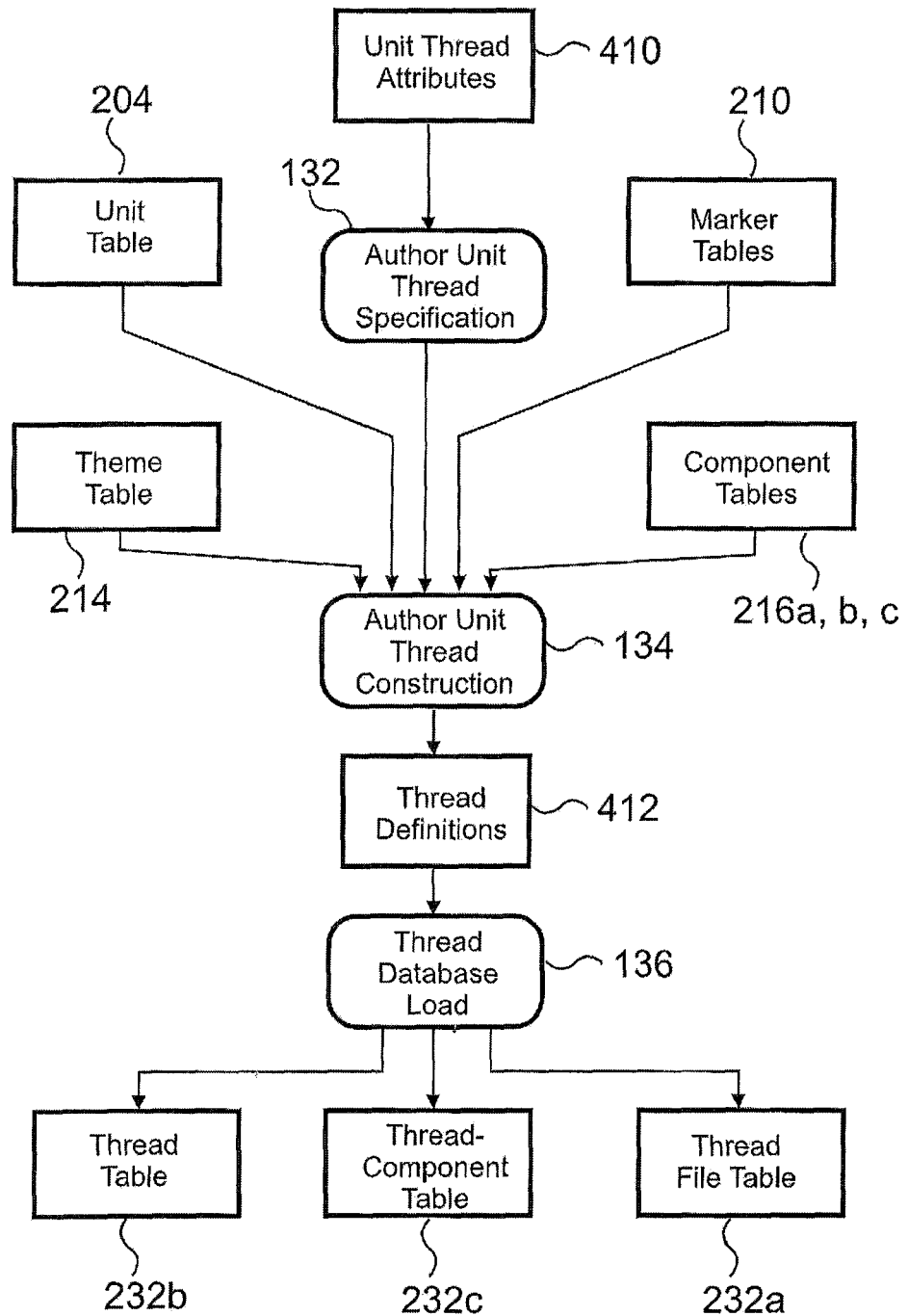
Figure 13:
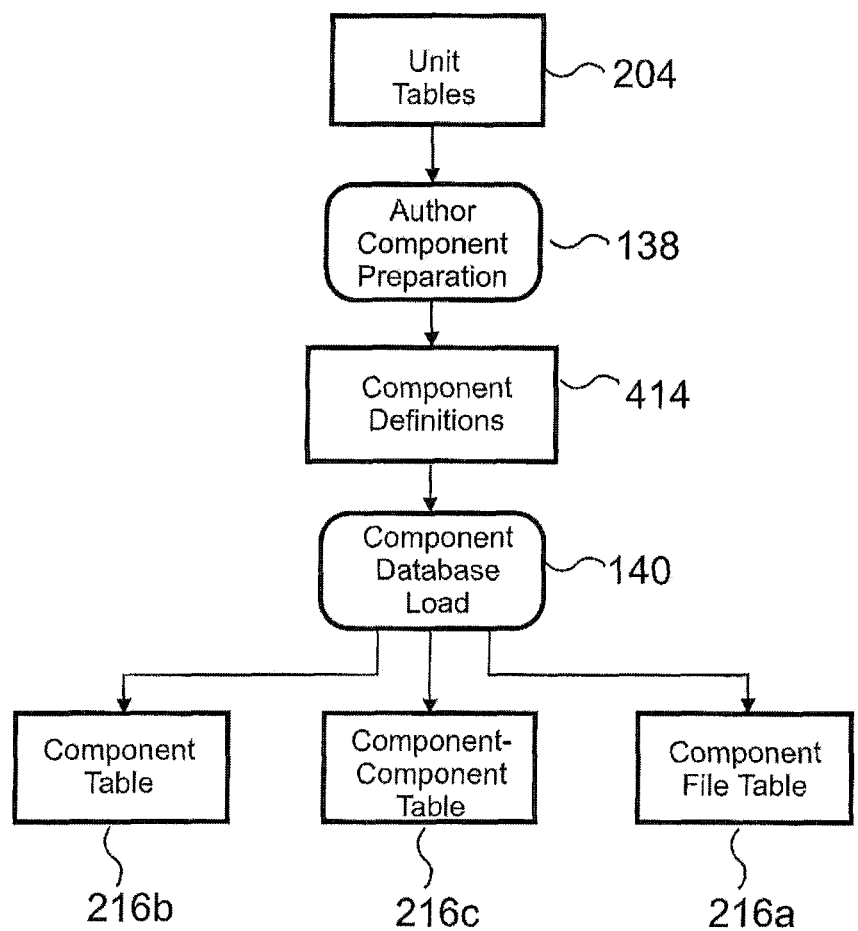
Figure 14:
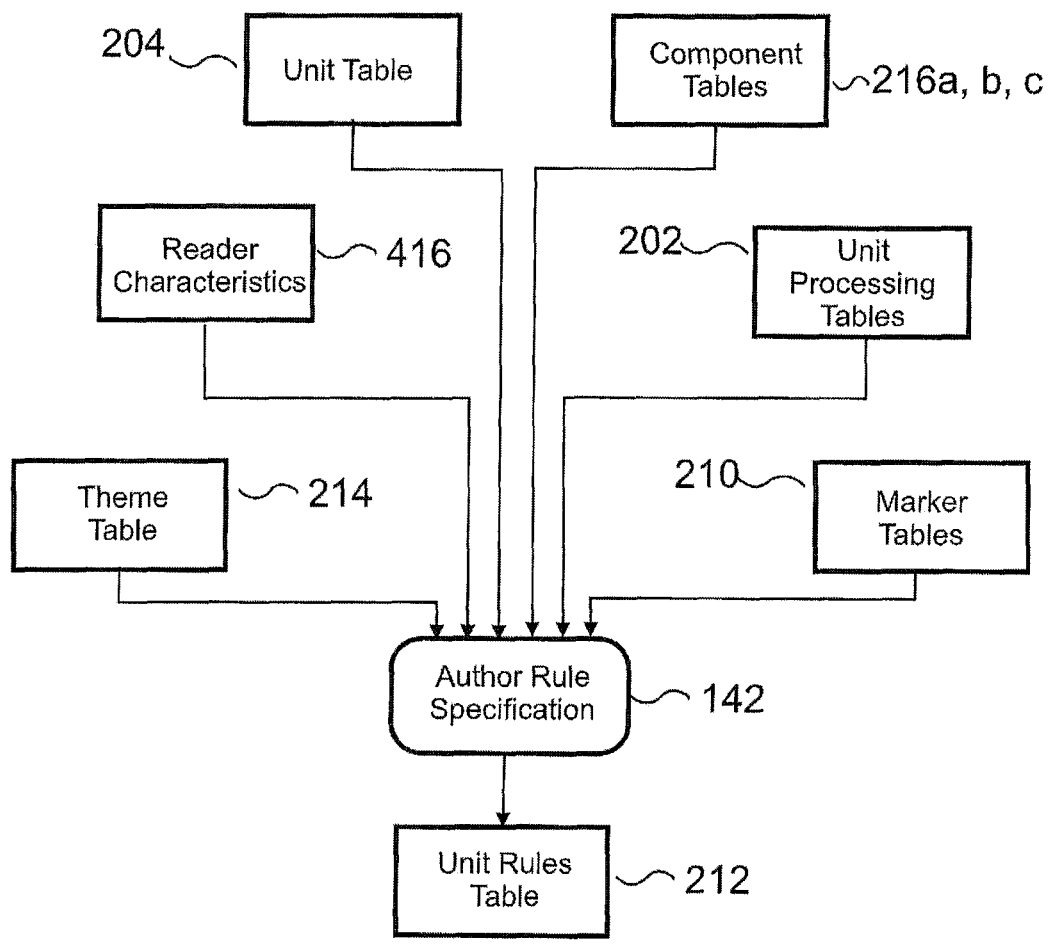
Figure 15:
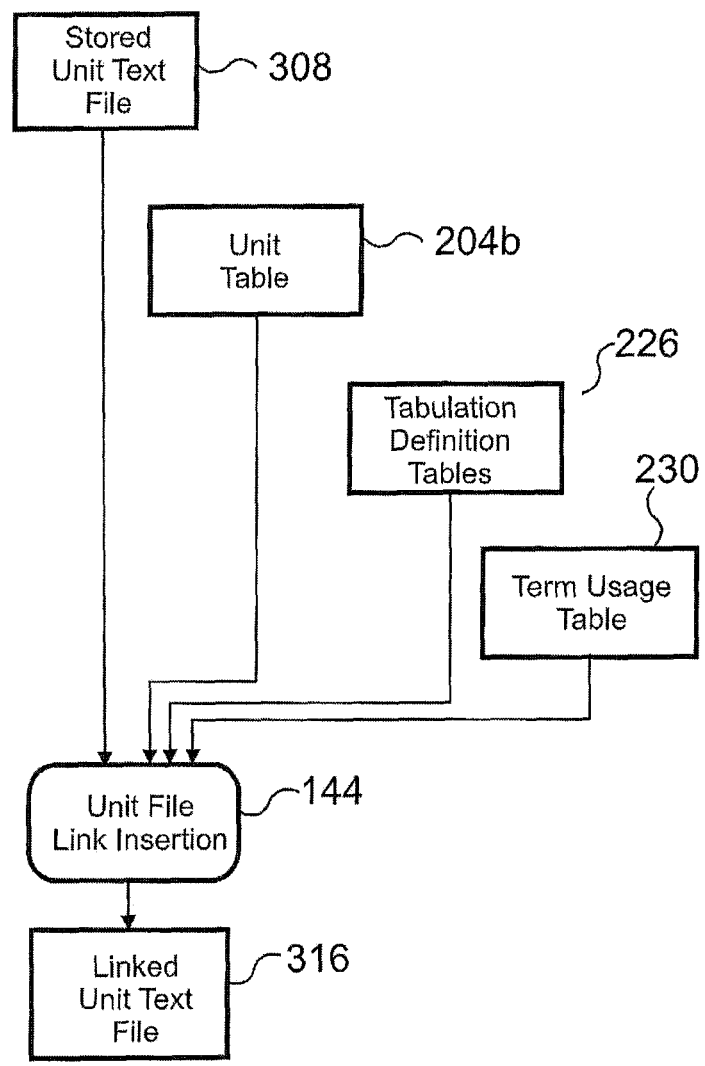
Figure 16:
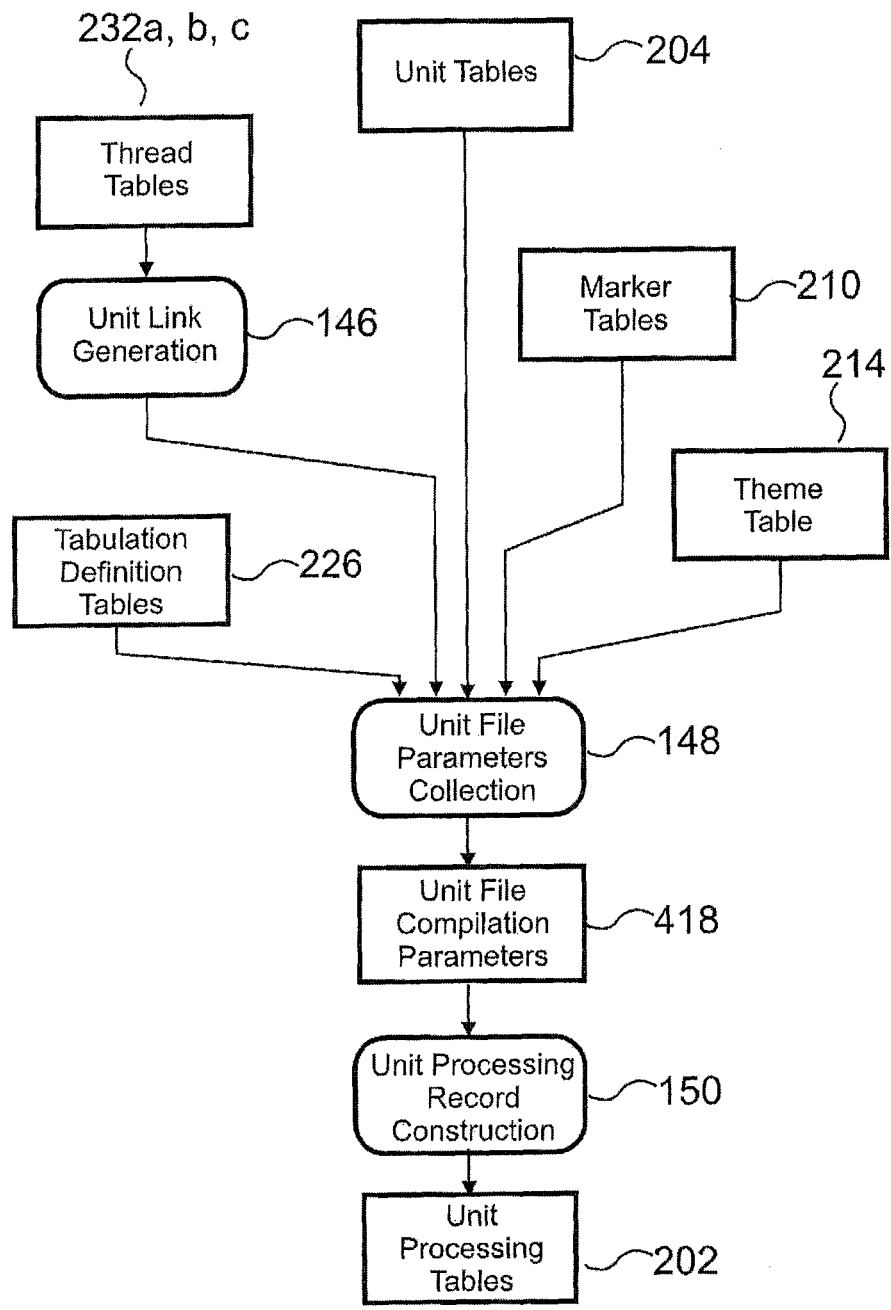
Figure 17:
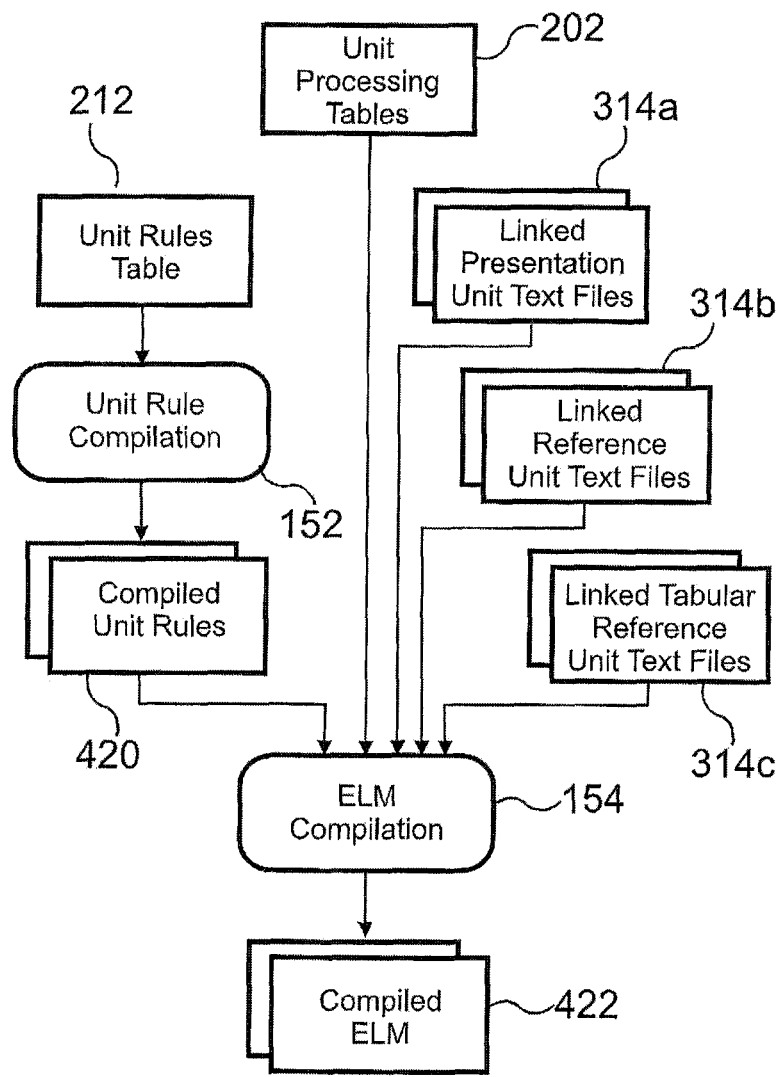
Figure 18:
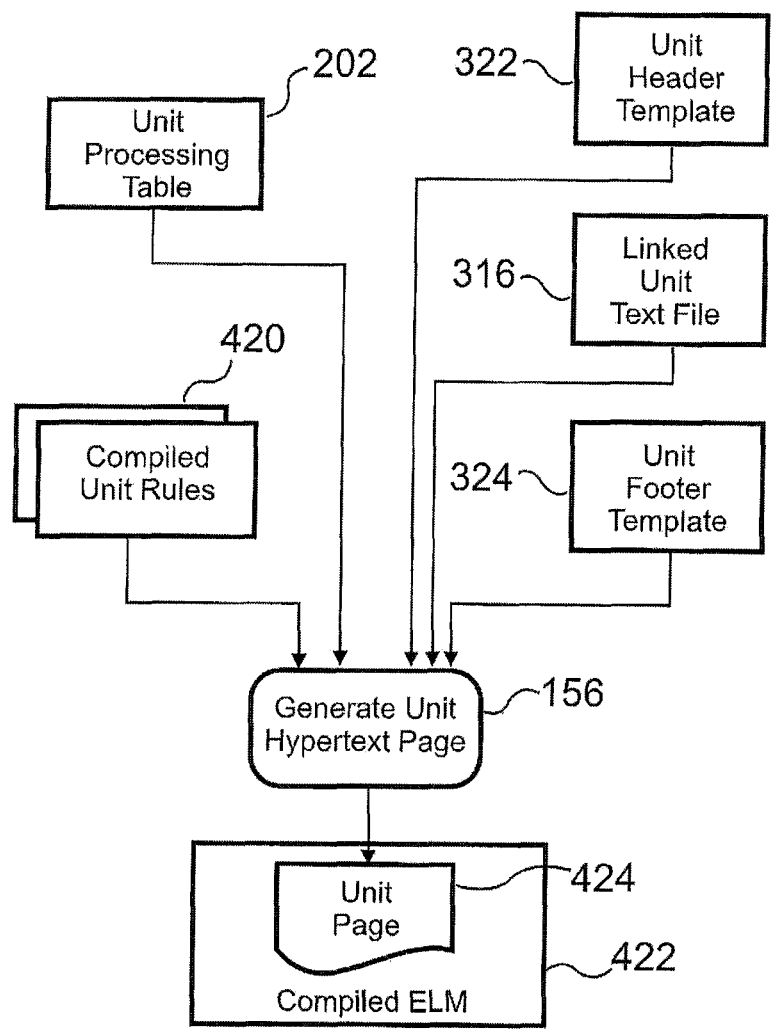
Figure 19:
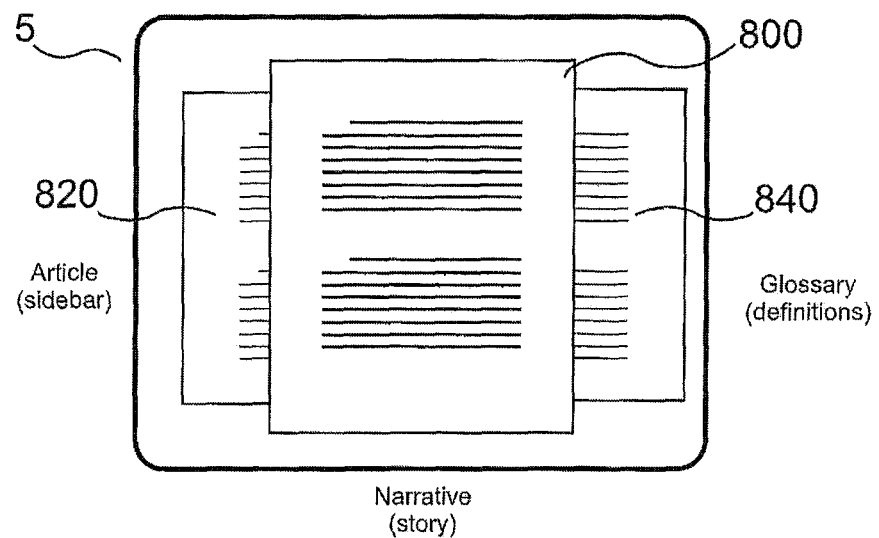
Figure 20:
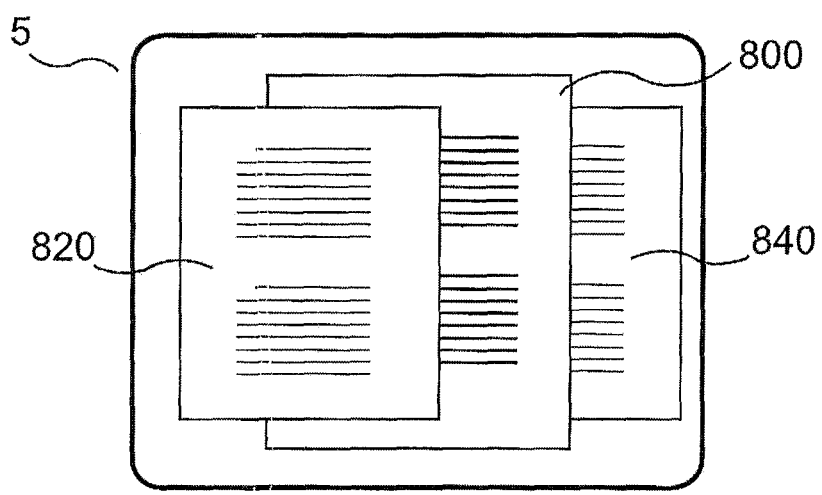
Figure 21:
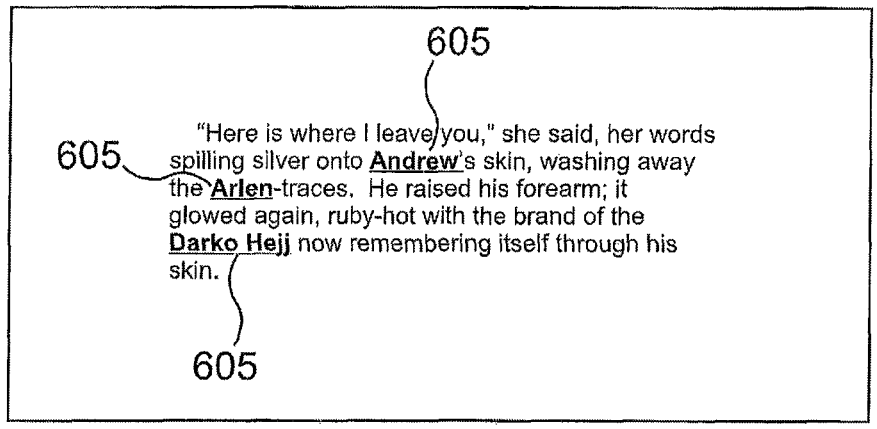
Figure 22:
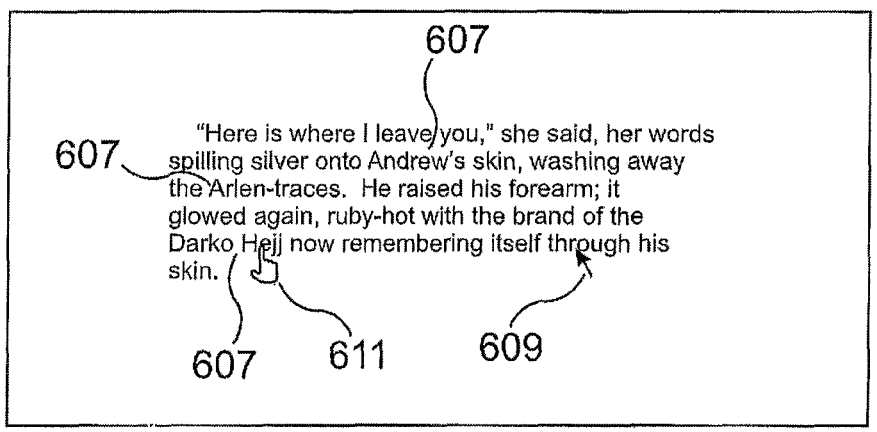

FIGS. 5a-c are block diagrams of an overview of knowledge database components used in an exemplary embodiment of the present invention;

FIG. 6 is a block diagram an overview of presentation database components used in an exemplary embodiment of the present invention;

FIG. 7 is a block diagram of the software components of an exemplary presentation computing system shown in FIG. 2;

FIG. 8 is a computer screen layout of a representative author screen form for the entry of the rules for a presentation unit in one exemplary embodiment of the present invention;

FIG. 9 is a block diagram of an overview of a process flow to prepare an ELM according to an exemplary embodiment of the invention;

FIG. 10 is a block diagram of an initial processing for the units of an author which are to be presented in some specified sequence to a reader in one exemplary embodiment of the invention;

FIG. 11 is a block diagram of initial processing for the units of an author which are to be made available for reference by a reader in an exemplary embodiment of the invention;

FIG. 12 is a block diagram of processing for creating threads or sequences for presentation of an author's work in one exemplary embodiment of the invention;

FIG. 13 is a block diagram of processing for combining units into components for creating structured works according to an exemplary embodiment of the present invention;

FIG. 14 is a block diagram of processing for supporting an author's specification of access and threading rules for the units to be shown to a reader according to one exemplary embodiment of the present invention;

FIG. 15 is a block diagram of the linking of text units to reference units according to one exemplary embodiment of the present invention;

FIG. 16 is a block diagram of the assembly of unit compilation information according to one exemplary embodiment of the present invention;

FIG. 17 is a block diagram of an overview of the compilation of the ELM according to one exemplary embodiment of the present invention;

FIG. 18 is a block diagram of the process to create a single ELM unit page according to an exemplary embodiment of the present invention;

FIG. 19 is an electronic display of the ELM's presentation to a reader of a presentation page according to one exemplary embodiment of the present invention;

FIG. 20 is an electronic display of the ELM's presentation to a reader of an accompanying reference page according to one exemplary embodiment of the present invention;

FIG. 21 is an electronic display of a prior art form of prose presentation;

FIG. 22 is an electronic display of a form of prose presentation according to an exemplary embodiment of the present invention.

Figure 23:
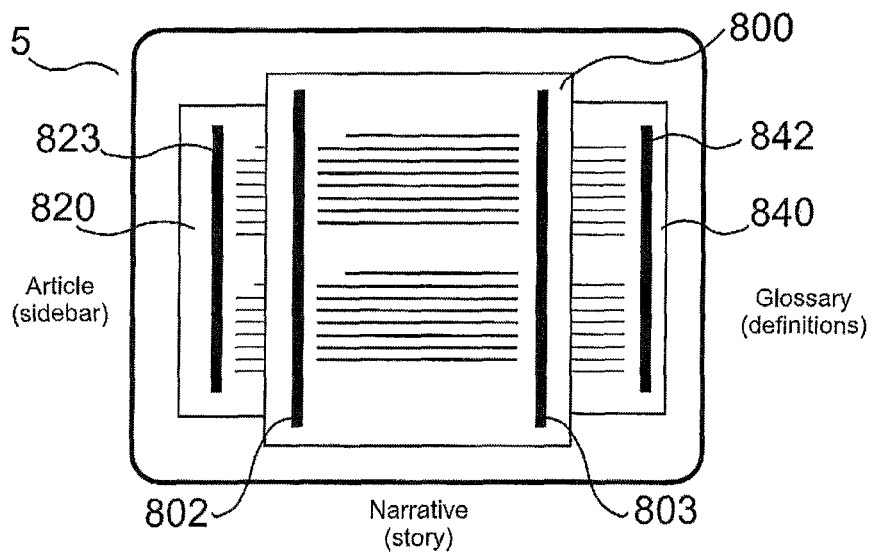
Figure 24:
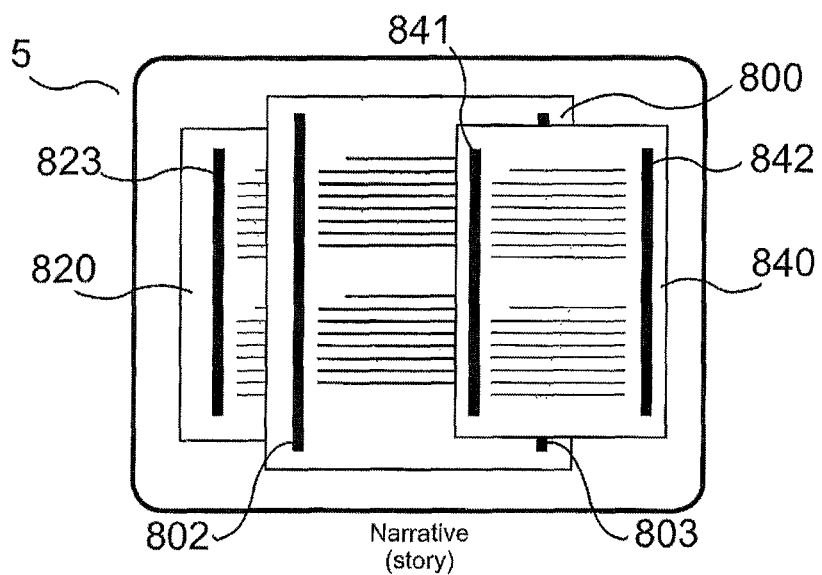
Figure 25:
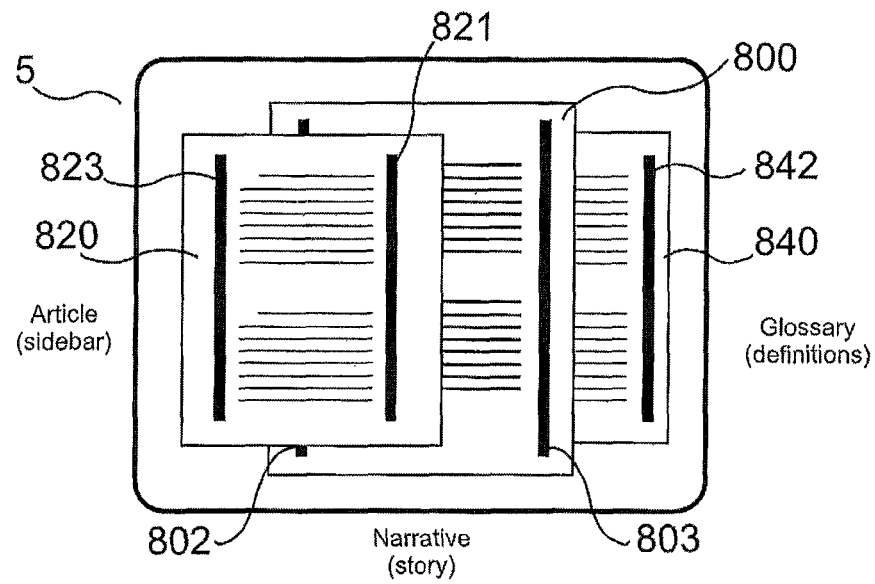
Figure 26:
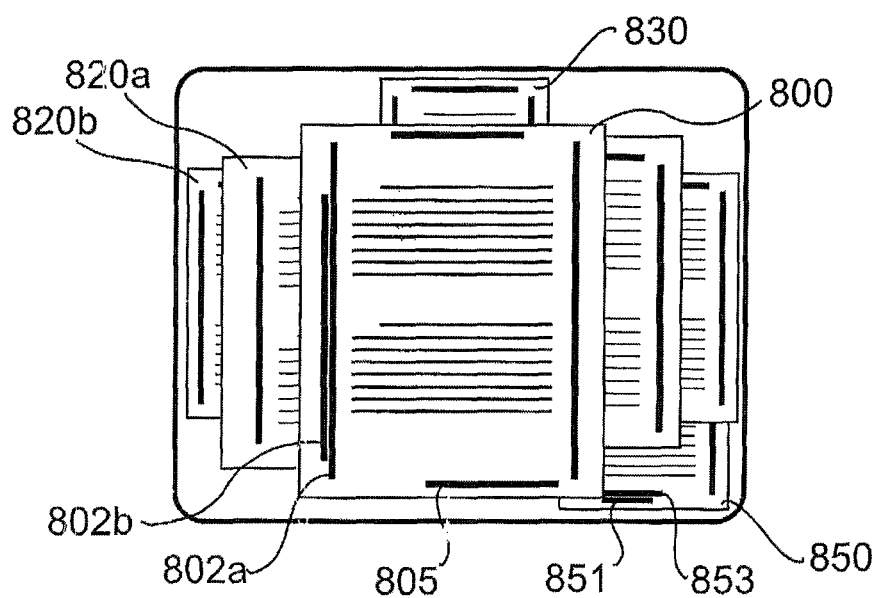
Figure 28:
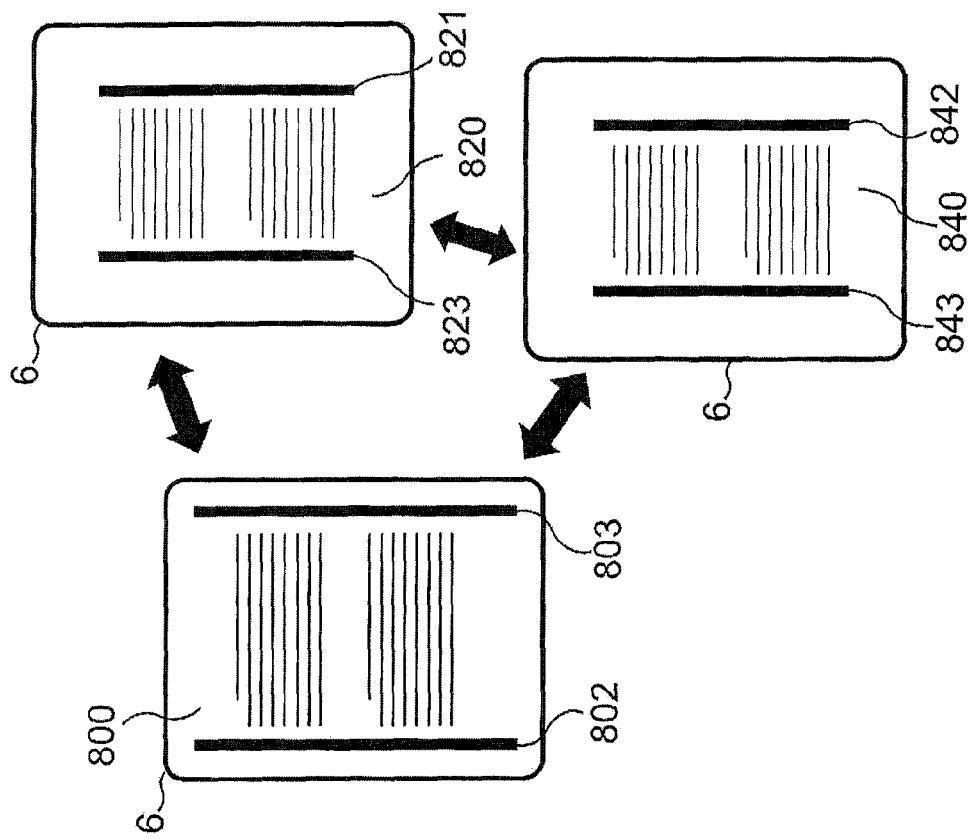
Figure 27:
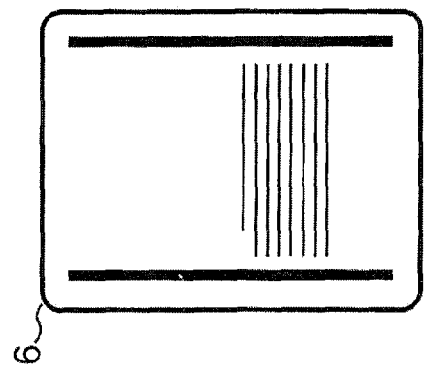
Figure 30:
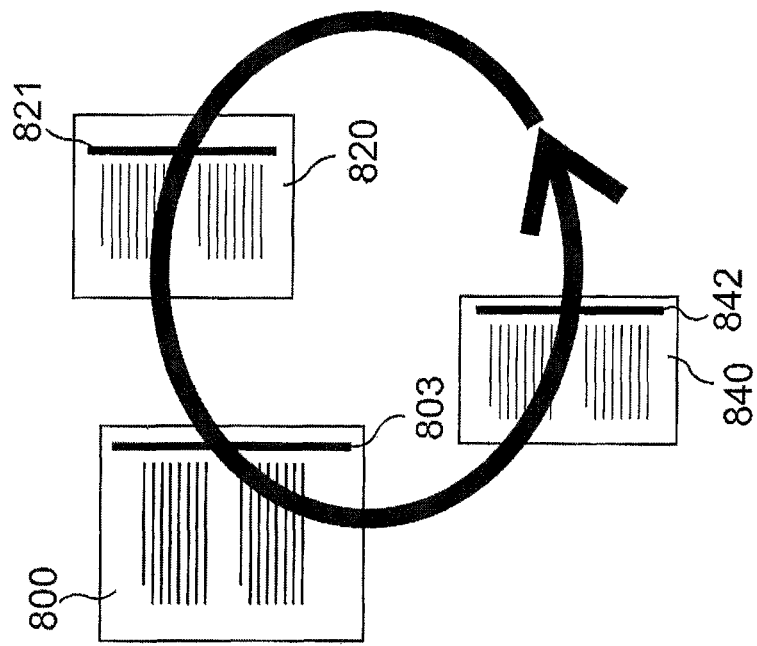
Figure 29:
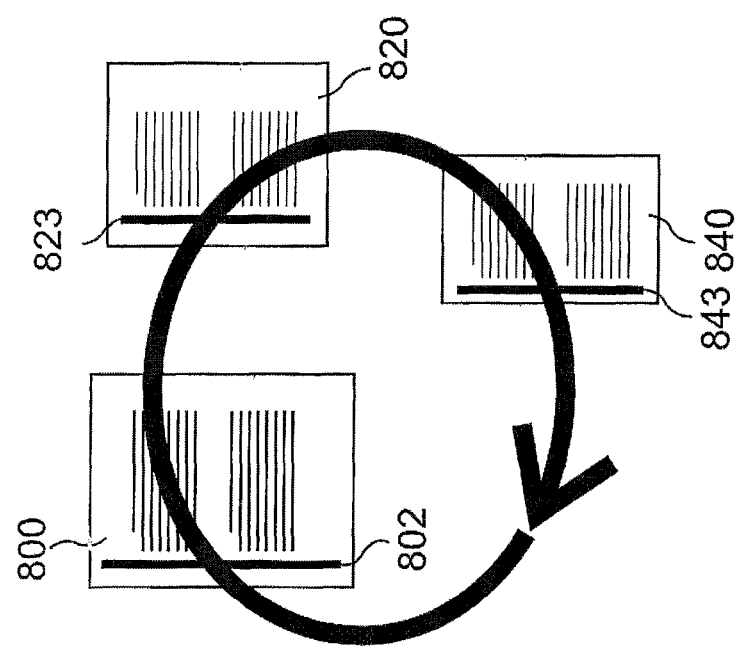

FIG. 23 is an electronic display of the ELM's presentation to a reader of a presentation page having Z-bars for quick page switching according to one exemplary embodiment of the present invention;

FIG. 24 is an electronic display of the ELM's presentation to a reader of a glossary page having Z-bars for quick page switching according to one exemplary embodiment of the present invention;

FIG. 25 is an electronic display of the ELM's presentation to a reader of a reference page having Z-bars for quick page switching according to one exemplary embodiment of the present invention;

FIG. 26 is an electronic display of the ELM's presentation to a reader of a set of pages each having multiple Z-bars for quick page switching according to one exemplary embodiment of the present invention;

FIG. 27 is an electronic display of an ELM display window with its Z-bars on a handheld device screen according to one exemplary embodiment of the present invention;

FIG. 28 is a diagram showing navigation among the ELM's presentation, reference, and glossary windows on a handheld device screen, using Z-bars according to one exemplary embodiment of the present invention;

FIG. 29 is a diagram showing loop navigation among the ELM's presentation, reference, and glossary windows on a handheld device screen, using only the left Z-bars according to one exemplary embodiment of the present invention; and FIG. 30 is a diagram showing loop navigation among the ELM's presentation, reference, and glossary windows on a handheld device screen, using only the right Z-bars according to one exemplary embodiment of the present invention.

DETAILED DESCRIPTION OF THE INVENTION

The electronic literary macramé, or "ELM," described in U.S. Pat. No. 7,810,021, issued Oct. 5, 2010, entitled "Apparatus and Method for Creating Literary Macramés," incorporated herein by reference, contains a wide range of functional capabilities. These capabilities reveal the ELM as a means for knowledge transfer from an author to a population of readers. Additional such capabilities are described in U.S. Provisional Patent Application No. 60/833,201, filed Jul. 25, 2006, entitled "Multiple Improvements in Method and Apparatus for Creating Literary Macramés," also incorporated herein by reference. The present description specifies further improvements and enhancements to the inventions disclosed by the two afore-mentioned applications. For the purposes of the present invention, the ELM constitutes a body of knowledge structured for immersive learning.

The preparation of the ELM is accomplished using a combination of software components which themselves comprise a tool, here termed a Knowledge Transfer Tool ("KTT"). The ELM constitutes the presentation output of the KTT for readers.

To illustrate features and functions of the KTT with examples, the development and use of an ELM of the life of Leonardo da Vinci is used in the following sections.

Components of the KTT

Documents in printed text form are available to readers in a bewildering range of formats. The simplest form, as exemplified in a literary work of fiction such as James Joyce's novel "Finnegans Wake", is a linear narrative text without footnotes or other secondary material, in which the work's great complexity is embedded within the language usage alone. The most complex forms, as exemplified in the physics textbook "Gravitation", by Kip Thorne, Charles Misner, and John Wheeler, incorporate numerous threads of discussion for different readerships, footnotes, endnotes, page and chapter cross-references, sidebars, glosses, expositions, index, and illustrations. Both forms present challenges to any reader.

The KTT enriches the simpler forms by offering an author or annotator a seamless and invisible way of granting a reader access to additional material without distracting symbols or marks in the text, permitting instant lookups and immediate return to the narrative without delay. The KTT simplifies the use of the complex forms by: 1) providing the author or editor with the ability to conceal background data until a reader requests it, at which point the information is presented without disrupting the flow of the reader's attention; 2) providing the author or editor with the ability to present different threads of reading to different readers, thereby eliminating reader distractions and waste of time; and 3) supplying a graphical user interface (GUI) for authors to facilitate ELM development and production.

Figure 1:
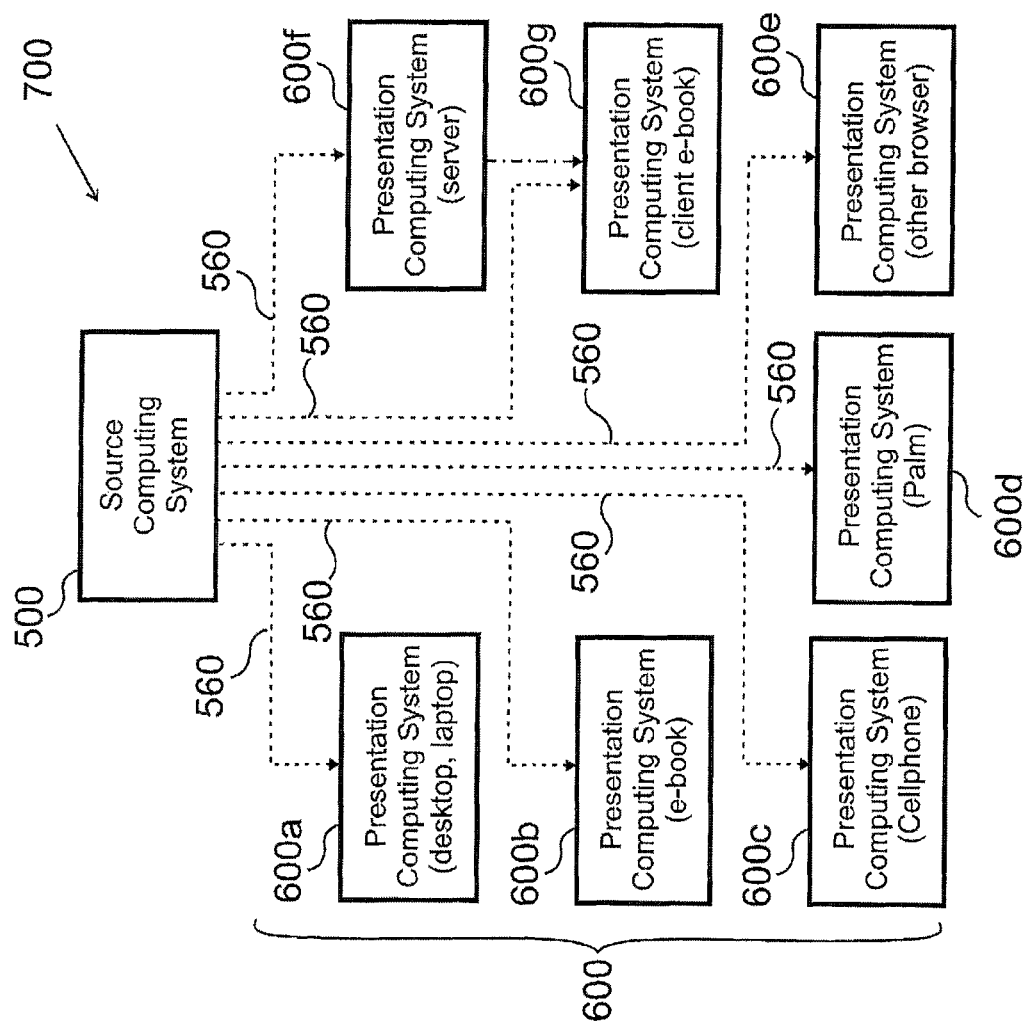
FIG. 1 is a block diagram showing an overview of one exemplary embodiment of the present invention.

Turning now to the drawings, FIG. 1 is a block diagram of an exemplary knowledge transfer tool 700 comprising a source computing system 500 for organizing knowledge for an author, one or more presentation computing systems 600a-g for presenting the author's organized knowledge to readers, and one or more distribution paths 560 between the source computing system 500 and each presentation computing system 600a-g. Presentation systems 600a-g, as shown, may include e-books such as Amazon's Kindle, Barnes and Noble's Nook, Sony's Reader, and others, notebooks, and handheld systems such as Sony's PSP. The distribution paths 560 may take any usable form suitable for the dissemination of data from source computing system 500 to a presentation computing system 600a-g, including a manual transfer of the data via physical storage media such as a flash memory drive or a compact disk, an automated transfer of the data via a direct wireless connection, or any other suitable means. Distribution paths 560 thus serve to transfer organized knowledge from the source computing system 500 to each presentation computing system 600a-g.

With reference to FIG. 2, an exemplary presentation computing system 600 of the knowledge transfer tool 700 comprises one or more presentation processing subsystems 602, one or more presentation memory and storage subsystems 604, one or more presentation communications subsystems 606, one or more reader interface subsystems 608, one or more presentation software processing components 610 residing in each presentation processing subsystem 602, and one or more interconnections 612 among the presentation processing subsystems 602. An exemplary source computing system 500 of the KTT 700 comprises one or more processing subsystems 502, one or more memory and storage subsystems 504 connected to each processing subsystem, one or more communications subsystems 506 connected to each processing subsystem, one or more author interface subsystems 508 connected to each processing subsystem, one or more source software components 510 residing in each processing subsystem, and one or more interconnections 512 among the processing subsystems 502.

Figure 3:
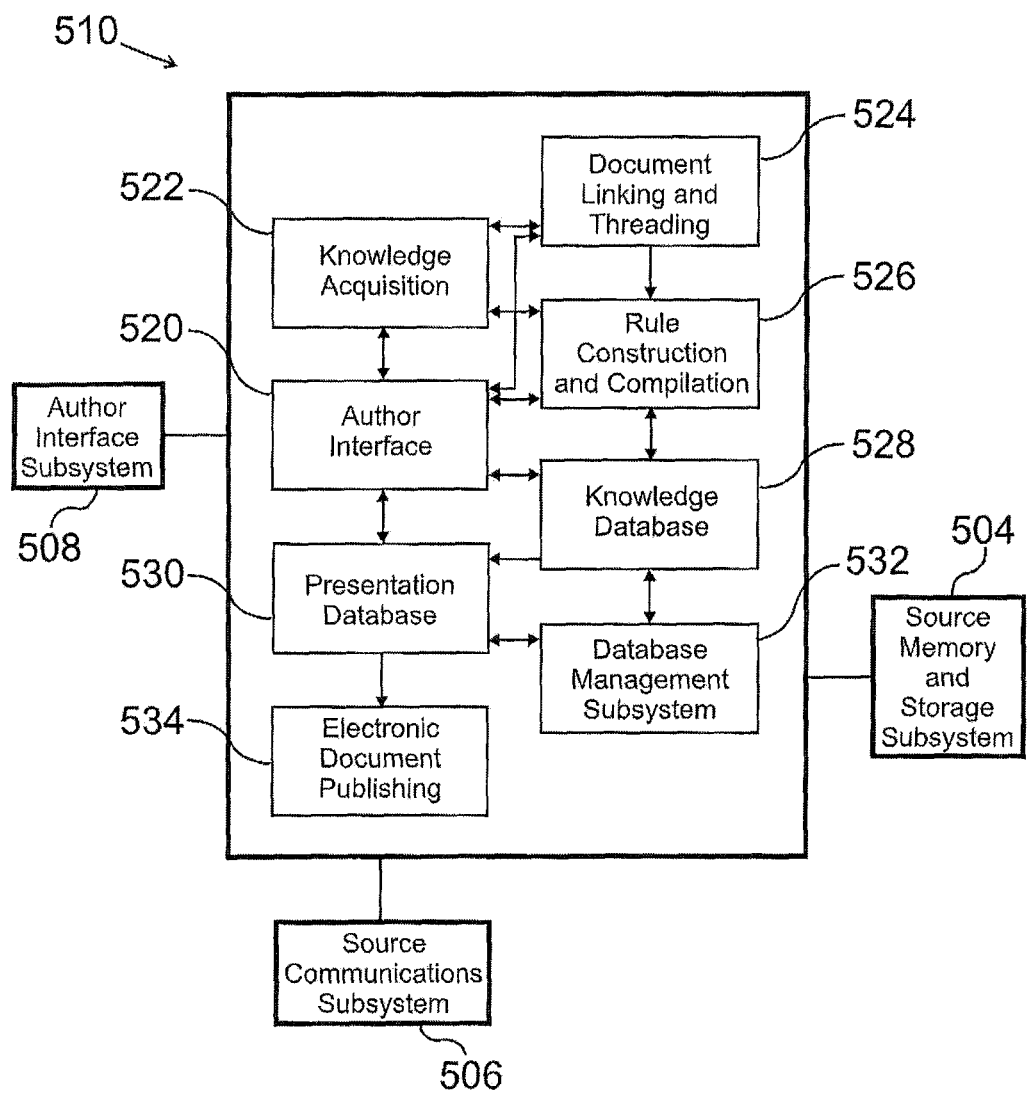
FIG. 3 is a block diagram of exemplary software components of the source computing system shown in FIG. 2.

Referring to FIG. 3, the KTT 700 may include a knowledge database, also termed herein a knowledge base 528, and a presentation database 530. The knowledge database contains: 1) the structural and functional definition of an ELM 710 and 2) a set of author-defined rules to manage presentation and sequencing of presentation units, also called herein "scenes", to a reader. The KTT's 700 use of rules is explained below in the section titled "The Rule Base of the KTT". The presentation database 530 contains the textual and other materials that are to be presented to the reader.

As shown in FIG. 3, the source software components 510 of the source computing system 500 may comprise an author interface software component 520, a document linking and threading software component 524, a database management subsystem 532, a knowledge database component 528, supported by the database management subsystem 532, a knowledge acquisition software component 522, a rule construction and compilation software component 526 connected to the knowledge database 528, a presentation database component 530, supported by the database management subsystem 532, and an electronic document publishing software component 534 connected to the knowledge database 528 and the presentation database 530.

Figure 4:
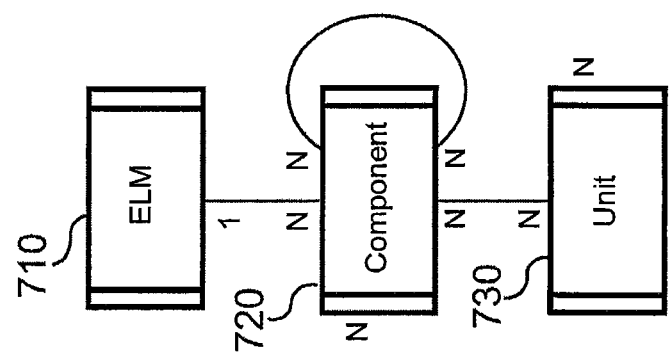
FIG. 4 is an entity relationship diagram of the structure of an ELM according to one exemplary embodiment of the present invention.

FIG. 4 outlines the basic structure of an ELM in the form of an entity-relationship (ER) diagram. ER diagrams are well-known in the art of database technology, and are used to define the abstract relationships among different entities defined in a database. Diverse conventions for entity-relationship diagrams exist. FIG. 4 identifies each entity within a box 710, 720, 730, with doubled sides representing the possible presence of multiple instances of an entity. Entities having direct relationships with each other are connected by lines 715, 725, 735. A number '1' by the end of a line 715 indicates that a single instance of the entity at that end is connected via the line. A letter 'N' by the end of a line indicates that multiple instances of the entity at that end are connected via the line. Thus for a single ELM in FIG. 4, there exist multiple (N) Components, and each Component is part of exactly one (1) ELM. Also in FIG. 7, an 'N' at each end of line 735 means that each Component may be made up of multiple Units, and each Unit may associate with multiple Components. Finally, the line circling around the end of box 720 with an 'N' at each end indicates that each Component may also be made up of multiple Components.

In more-complete forms of ER diagrams, the relationships between entity pairs are spelled out, so that a full form of FIG. 4 would have text indicating that an ELM 710 is made up of Components, a Component is made up of Units or Components, a Unit may appear in multiple Components, and so forth.

The ER diagram may be used to describe the KTT's knowledge database 528, from which the ELM is generated. FIG. 5a shows the relationships among the entities in the knowledge database 528, which contains the structural and processing information for building an ELM and the rules to manage presentation and sequencing of presentation units of that ELM to a reader. The set of entities in knowledge database 528 comprises unit processing definitions 202 for constructing units for presentation to a reader, units 204 defining both structure and content for presentation, markers 210 for selecting specific units, rules 212 for ordering unit presentation, themes 214 for relating unit presentations, components 216 for grouping units, tabulation definitions 226 for arraying unit information for presentation, terms 228 used in units, term usages 230 for terms as used in units, and threads 232 for sequencing units and components in presentation. The entities are related as shown by the connecting lines between any pair of entities. Due to the universal character of the rules 212 used, any rule may relate to any other entity. The "N . . . N" at the ends of a connecting line between two entities signify a many-to-many relationship between the two entities. For example, in the case of units 204 and threads 232, a single unit may be related directly to (contained within) many threads, and a single thread may be related to (contain) many units.

When designing a database implementation, such many-to-many relationships are constructed as additional tables listing each valid combination of the two entities in the relationship. FIG. 5*b* shows such implemented tables as small rectangles 293, and identifies specifically the construction of a component-component table 216*c* to associate different components in component table 216*b*, and the construction of a thread-component table 232*c* to associate different threads and components in thread table 232*b* and component table 216*b* respectively. The remaining small rectangles represent other many-to-many relationships in the knowledge database 528.

See FIG. 4*c*. A complete implementation of knowledge database 528 incorporates additional tables as needed. As implemented in its basic embodiment, knowledge base 528 comprises a unit rules table 212 specifying conditions determining actions to be taken in the presentation process, a component file table 216*a*, a component table 216*b*, and a component-component table 216*c*, containing sets of units and components for each component and comprising component definitions, a thread file table 232*a*, a thread table 232*b*, and a thread-component table 232*c*, containing sequences of units and components for each thread and comprising thread definitions; and unit processing tables 202 and one or more unit tables 204, containing properties of units and comprising unit definitions, wherein components are each a collection of one or more Units. The remaining tables shown in FIG. 5*b* are not shown in FIG. 5*c*, but may be implemented similarly.

In addition, and referring to FIGS. 5*a-c*, the knowledge base 528 stores theme information in a theme table 214 for generating sequences of information units for presentation, and marker information in marker tables 210 for generating collections of unsequenced information units for presentation as reference data. Furthermore, the knowledge base 528 stores term information in a term table 228 and a term usage table 230 for use in generating glossaries, and tabulation definitions in tabulation definition tables 226 for defining organizations of information within a unit for formatted presentation to a reader.

As shown in FIG. 6, an exemplary presentation database 530 may comprise one or more information units stored in the forms of unit source files 304, base unit text files 306, stored unit text files 308, reference unit text files 310, tabular reference unit text files 312, linked presentation unit text files 314*a*, linked reference unit text files 314*b*, and linked tabular reference unit text files 314*c*, containing information for use by a reader. The presentation database 530 also holds one or more compiled unit rules 420 specifying conditions determining actions to be taken in the presentation process, and one or more linked unit text files 316, unit header templates 322 and unit footer templates 324, containing information for the formatting of material presented to a reader.

The KTT 700 uses the knowledge database 528 in the source computing system 500 to generate the ELM for a reader in a user-readable form as stored in the presentation database 530, which user-readable form the KTT 700 prepares for use in presentation computing systems 600.

FIELD OF THE INVENTION

The present invention relates to the creation of texts readable on electronic 626, such as a Web, browser, a compiled ELM 422 further comprising textual and other materials for presentation to readers, and one or more formatting components 628 containing information for the formatting of material presented to a reader. The KTT's 700 base distribution embodiment of its ELM may use a client-only Web-page architecture that may utilize HTML/CSS/JavaScript software components, with its links among Web pages stored in a set of electronic files in one or more folders on a single portable presentation device such as a CD-ROM, a DVD, or a flash memory chip, for example. The restriction of the base distribution embodiment to a client-only form lessens the tendency to incorporate or otherwise link to material not within the scope of the ELM, thereby mitigating distraction from the ELM's focus.

The KTT 700 may also be configured in a first commercial distribution embodiment that divides an electronic literary macramé (ELM) into a freely-provided, client-only first part and a client-server second part that may be either purchased or freely provided, and provides hypertext links between the first and second parts. The reader obtains the first part by file transfer, streaming, download, portable memory, or other electronic means. When the reader selects a link in the first part that accesses the second part, the reader's browser is redirected to a server Web page soliciting purchase, lease, or other payment for access to the second part. The author maintains, develops, changes, and restructures the second part of the ELM on a continuing basis, thereby sustaining reader interest in the ELM as a whole, and offering the reader continued views into the creative process and any corrections and updates required for an evolving ELM. An author may also use the KTT to advertise to readers new versions of the ELM as a whole, made available for download or other transfer process as the author considers appropriate. By applying this particular strategy to works of literature in an ongoing state of development, the ELM offers the publisher substantial reductions of risk in publishing, and potential gains in profits from works sold.

In a second commercial distribution embodiment, the KTT 700 may treat its units as commodity objects, which are handled in a manner analogous to the trading cards such as the Yu-Gi-Oh cards and other similar products. An ELM author makes disconnected units available on a commercial Website for sale and download, and these units are assembled by the reader into a coherent narrative. The actual sequence of the narrative, or more than one such sequence, is also made available for sale and download by the author. In effect, an ELM narrative is assembled and added to an ELM using these means.

In addition to electronic presentation of units, physical presentations of ELM units may be made in the form of trading cards, individually or in packets, which add to the content and value of a narrative published as a component of an ELM. A reader may collect an entire narrative by gathering and trading for its component unit cards, and the overall narrative then forms an extension of an ELM in electronic form. By gradually making unit cards available in serial fashion, either in electronic or physical form, an author thereby develops interest and focused attention on a continually-extending narrative line. Such interest and attention are enhanced by a full spectrum of packaging and presentation options now available for existing commodities: boxed sets, encrypted or coded texts, attractive graphical images, multimedia clips, colorful and dynamic decoration, toolsets for viewing, decoding, and transmitting, and more.

One type of packaging usable for unit trading is the digital photographic image, which the KTT 700 may exploit by making units and other narrative components available for printing on a digital photo printer using paper or card stock designed for higher-quality reproduction of images. The purchaser downloads the acquired images of narrative components and prints them for use. In this way, each small component of a narrative—a unit—becomes a marketable entity by itself. The author and publisher then profit from the purchase of unit information, at a unit-by-unit level, instead of waiting for the entire finished product to emerge from the publishing process.

The KTT may optionally provide a digital watermark embodiment, in which information of interest to a reader of the ELM is embedded in a concealed and distributed form in the nondisplayed portions of the ELM. For details of the KTT's 700 digital watermark, reference is made to U.S. Pat. No. 7,555,138, entitled "Method and Apparatus for Digital Watermarking for the Electronic Literary Macramé," incorporated herein by reference. The KTT 700 changes the conventional nature of the watermark by deepening its role in the ELM, since the watermark becomes what is termed in cryptographic parlance a "side channel" for conveying narrative-related information to a reader outside the primary communications stream. If a reader removes the digital watermark from the work, the side channel containing narrative-related information is destroyed, and the literary value of the work is thereby diminished.

In its digital watermark embodiment, the KTT 700 may replace a subset of an ELM's HTML link-anchor values with a set of strings taken from unpublished portions of the ELM's narrative text, encode the strings to remove redundancies that would cause collisions among the values produced, and store the encoded strings as HTML link anchors embedded in Web pages comprising the ELM. The KTT 700 also may provide code to be executed by the reader's browser program which collects and orders the strings to reconstruct and present the unpublished portion of text to the reader, at the reader's selection of an appropriate link embedded in the ELM. The distributed narrative text comprises the watermark for the ELM.

In additional digital watermark embodiments, the KTT 700 may identify elements of the ELM by using a text-substitution scheme similar to that proposed hereinabove, but extended to use embedded filenames, pathnames, and other classes of identifiers and text as a means of storing and retrieving concealed content of the ELM.

The Knowledge Database of the KTT

The knowledge database 528 of the KTT 700 may be defined in a relational embodiment as a set of relational tables. In the relational embodiment the database 528 is a relational database. The database 528 of the KTT 700 may be defined in an object embodiment as an object-oriented database. The database 528 of the KTT 700 may be defined in a text-file embodiment as a collection of text files. In a spreadsheet embodiment, the KTT's 700 database 528 may be defined as a collection of sets of rows and columns in one or more spreadsheets.

Referencing FIG. 5c, the tables of the database 528 contain the knowledge, facts, and values that comprise the content and organization of an instance of the invention's ELM that is to be presented to a reader. The fundamental element of the KTT 700 is the Unit, which is a single displayable entity such as a Web page accessible to a reader via a single selection such as a mouse click, for example. A Unit may require scrolling or other positioning within the viewing frame of the reader, using conventional browser controls, to view its entire visible content. Unit definitions are stored in the Unit Table 204. The Units themselves may be stored either in the Unit Table 204 or as separate files designated in the Unit Table 204. In one exemplary embodiment of the present invention, the contents of Units for reader presentation are stored in linked hypertext files. In a presentation-system database embodiment, the contents of Units for reader presentation are stored in a database 530 accessible to a standard browser by any means well-known in the art.

The Unit may comprise a lesson unit in a textbook instance of the KTT 700, it may comprise a scene in a literary instance of the KTT 700, it may comprise a sidebar or other reference in any instance, or it may comprise any other form of presentation selectable by a single operation, such as a list, a glossary section, a video clip, an audio clip, an animation, or an image or set of images.

A Unit such as a list or a glossary section contains additional structure. In a first sub-Unit structure embodiment, the KTT's 700 database 528 may provide for the definition and presentation of Terms and Tabulations. A Term definition, stored in the Term Table 228, defines a word, phrase, or symbol of the author's usage, including alternate forms used. Alternate forms for a Term are stored in the Term Usage Table 230.

The KTT 700 may collect Terms into subsets for presentation in one or more glossary sections, dictionary pages, or similar groupings. Each such grouping comprises a Unit. The KTT 700 aggregates and orders Terms into glossaries and indices as directed by an author. A specific glossary for the ELM on the life of Leonardo da Vinci might contain a list of all the surface preparations he used in his painting, in alphabetical order, with a description for each one, while another specific glossary for the same ELM might contain a similar list of all the military inventions he is supposed to have generated. For each such glossary, the KTT 700 generates an index referring the reader to each location in the ELM's narrative where each Term is used.

A Tabulation defines a row-and-column arrangement of data, otherwise known as a table, including tabular headings and titles, which may be incorporated by the author into Units of the KTT 700. Tabulations are defined in the Tabulation Definition Tables 226 as also shown in FIG. 5c. The KTT 700 may prompt an author for the definition of a Tabulation, requesting column headings, row headings, descriptive and formatting information for rows and columns, the data content of each row and column of the Tabulation, and/or one or more templates for generating a textual definition for each entry of the Tabulation. The KTT 700 further may provide glossary-style storage of text description of Tabulation entries in Term form, so that a reader may either peruse the table entry directly in its table location or else look at each table entry in isolated text form in a supplementary glossary. The KTT 700 may generate a link from each table entry to its corresponding generated glossary entry, and a link from the generated glossary entry back to the table.

An example of a Tabulation in the da Vinci ELM would be a table showing a column for each major era of da Vinci's life and a row for each category of work or research in which he engaged. Each entry in the table would contain a word or short phrase indicating whether or not he did work of a particular type in a particular era. A reader selecting the entry would be shown a glossary supplement entry spelling out the entry in relation to the rows and columns defined for the table. Selecting the name of the Tabulation in the glossary supplement entry returns the reader to the display of the Tabulation.

An author incorporates Tabulations in other Units of reference information, so that the context of the Tabulation can be shown.

In order to present Units to a reader in a meaningful, instructive, and stimulating framework, the KTT 700 may provide for the placing of Units into sequences called Threads. Each Thread defines an order in which its units are to be presented. Any Unit may appear in any number of Threads. The KTT 700 provides a means for offering the selection of different sets of Threads for different sets of readers. Thread definitions are stored in the Thread Component Table 232*c* as shown in FIG. 5*c*.

In order to simplify the organization of Threads, the KTT 700 further may provide for the definition of Components, which are collections of Units. Referring again to FIG. 4, the top-level entity in the ELM is the ELM 710 itself. Each Component comprises a set of Components 720, Units 730, or a mixture of Components and Units. Components 730 are defined as shown in FIG. 5*c* in the Component Table 216*b*, and the relationships among Components are defined in the Component-Component Table 216*c*, in an arrangement resembling that of a manufacturing component-assembly database.

The Thread is the specification of reading order for Components. The KTT 700 provides for a base Thread for each Component. The base thread for a Component defines a principal or default sequence in which the set of the Component's elements are to be presented. For example, let an ELM comprise a set of parts, each part a set of chapters, each chapter a set of sections, and each section a set of Units. Parts, chapters, and sections are all Components. Then the KTT provides a thread of the ELM's parts, a thread for each part's chapters, a thread for each chapter's sections, and a thread for each section's units.

The examplary da Vinci ELM might have two Threads, the first one being the chronological Thread of his life, and the second the topical Thread of his categories of work. A reader of the first Thread would follow da Vinci's life in order, while a reader of the second Thread would traverse all the different types of work he did, in some other convenient author-determined order such as Painting, Sculpture, War Machines, Natural Science, Diversions. In the first Thread, each Component might be a chapter comprised of Units. In the second thread, each Component might be a Unit. Overlapping sets of the same Units might appear in both Threads, but in different order.

The author may set aside any or all of the KTT's 700 principal sequences and define others as needed. The author's defined Threads may freely intermix Components and Units at any level. Thus, in the example above, an author may define an added Thread that begins with a single Unit, continues with a part, interposes a section, continues with the next part, and so on.

To provide further flexibility, the KTT's 700 database 528 may include definitions of Markers that relate otherwise-unconnected Units to each other via selected Terms, and of Themes that identify common elements such as Terms that appear in a sequence of Units. Continuing with FIG. 5*b*, Markers are defined in the Marker Tables 210, and Themes in the Theme Table 214. Themes provide the KTT 700 with input to its processes for creation of additional threaded structures, called Traces, so that an author can offer readers additional options for traversing an ELM. In the da Vinci example, one theme might be Leonardo's point of view in a Unit, and another might be Michelangelo's presence in a Unit. Traces rely on the presence of one or more ordering criteria associated with each Unit such as dates and times, sequence numbers, or lexical order to establish a sequence of presentation to a reader. Using a time sequence, the Leonardo point-of-view Trace would lead the reader though the Units where Leonardo would be the point of view character. The Michelangelo presence Trace would instead lead the reader through the Units where Michelangelo appears in the Unit. Both Traces would be in chronological order.

Markers provide the KTT 700 with input to its processes for creating additional unordered collections of reference Units, allowing a reader to browse through focused sets of articles, notes, or other ancillary materials. No ordering criteria are needed for the use of Markers. A Marker in the da Vinci example might be a medium of painting, identified in presentation Units by any of a specific set of phrases such as 'oil painting', 'tempera', 'watercolor', 'encaustic', or other identifying phrase, so that the resulting collection comprises a self-contained discussion of painting media in general. Thereby the KTT 700 stimulates the reader with presentations of sufficient scope and interest, and supports the reader's rapid acquisition of knowledge details.

The KTT's 700 database 528 organization as shown in FIG. 5*b* contains additional tables and relationships as required to support its operation. The Unit Processing Tables 202 hold all information required to transform an input unit of information into the richly-linked form the KTT 700 produces. The Unit Rules Table 212 may store for each Unit one or more sets of presentation rules to be applied in a guided-access embodiment which may optionally be used by authors wishing to control a reader's access to a series of presentations.

Presentation to Readers

The KTT's 700 Component organization, and its Traces and Threads, are invisible to the reader at the time of presentation. The KTT 700 presents the reader with a menu or other choice of Thread titles, the reader selects a title, and then the reader selects either the next or the previous Unit on the Thread. There is no general requirement for the reader to choose among Threads. The KTT 700 provides for such choices as needed, but suppresses their presentation under most conditions. Thereby the KTT 700 sustains the reader's immersion in the material, and focuses and guides the reader through orderly sequencings of the material.

The KTT 700 may provide for the optional presentation of a menu or other selection of Threads to be followed by a reader on completing the perusal of a Unit. With the availability of multiple Threads to be followed from any Unit, the KTT 700 stimulates the reader with presentations of sufficient scope and interest. To streamline the selection of Threads, the author may characterize different classes of readers in a reader characterization input to the KTT 700. The author specifies for each Unit the criteria which must be satisfied for a reader to view the Unit. The KTT 700 supplies a graphical user interface to register each reader's characteristics when said reader first accesses a specific ELM.

In a first access-rule embodiment, for each Unit the KTT 700 may prompt an author for a set of unit transition rules to be applied at the time any link to a Unit is to be displayed or used. The KTT 700 may store the rules constructed by the author in its knowledge database 528. The KTT's 700 rule conditions may include the class of reader, the Units considered presentation prerequisites to the presentation of the Unit in question, and any other conditions potentially affecting the decision to display the Unit to the reader. The KTT 700 may retrieve its Unit transition rules from its database 528 and compile or otherwise store said rules for evaluation at the time the reader accesses each Unit of the ELM. The KTT's 700 use of Unit transition rules helps assure validity and relevance of the material presented to a given reader.

As described in the incorporated applications, the KTT 700 links all Terms mentioned in its Units to the definitions of those Terms, to indices showing other uses of the Terms, and to tabulated definitions of the Terms. The KTT 700 also provides the author with the ability to insert and maintain links among different Units. All such links of all types are presented to readers in the most unobtrusive forms, thereby helping maintain the reader's immersion in the material.

The KTT's 700 combination of Units, Components, Threads, Tabulations, Terms, rules and rich linkings among its elements presented to readers stimulates any reader with presentations of sufficient scope and interest, and supports the reader's rapid acquisition of knowledge details.

To facilitate an author's construction of an ELM, the KTT 700 may furnish a conventional graphical user interface to populate and maintain its databases 528, 530. The KTT 700 further may provide a set of software tools that facilitate the author's conversion of conventional electronic documents into forms suitable for loading into its databases 528, 530.

The KTT's 700 database 528, 530 embodiments may optionally use a conventional database software subsystem that supports tables and relations in the SQL form. One embodiment of the KTT's databases 528, 530 uses MySQL, an open-source relational DBMS. Other embodiments may use similar products, either open-source, commercial, or freeware. A spreadsheet database embodiment of the KTT 700 may use a commercial spreadsheet software subsystem optionally coupled with specialized scripts to manage the author's data. Numerous database embodiments are possible, and the KTT 700 works in any of them, including possible combinations of different database software subsystems working in federated or interoperable architectures.

The Rule Base of the KTT

The KTT provides for the incorporation of rules that determine how readers may interact with the presentation of the content (ELM) produced by the KTT 700. An author supplies rule definitions to the KTT 700 using a conventional graphical user interface (GUI). See FIG. 8 for a representative embodiment of a screen form 900 for entering rule definitions. Many variations on the embodiment shown in FIG. 8 are possible using conventional user interface designs.

The author first enters a Rule ID 902 and Rule Title 904 to identify the rule being created, and selects from drop-down menus to specify one or more Reader Levels 906 and Reader Categories 908 to which the rule applies. Reader Levels 906 and Reader Categories 908 are separately established using conventional permissions applications. The author then selects a single Unit ID 910 from a drop-down menu of Unit IDs indicating the Unit to which the rule applies. The Unit Title 912 and Unit Description 914 are displayed by the interface to assist the author in creating rules. The author then selects one or more prerequisite Unit IDs from a drop-down menu to create the Prerequisite Unit ID List 916 specifying all Units which must be presented before the Unit to which the rule applies can be presented to the reader level and category given earlier.

The author may create different rules for the same Unit as accessed during the reader's traversal of different Threads. To use this feature, the author selects one or more Thread IDs 920 from a drop-down menu of Thread IDs indicating the Thread(s) for which the rule applies. The Thread Title 922 and Thread Description 924 are displayed by the interface to assist the author in creating rules. The author then selects zero or more prerequisite Thread IDs from a drop-down menu to create the Prerequisite Thread ID List 926 specifying all Threads which must be presented before the Unit to which the rule applies can be presented to the reader level and category given earlier.

Using the screen shown in FIG. 8, an author may also define rules having no prerequisite Units, no prerequisite Threads, or no prerequisites of either type.

The KTT 700 may compile or otherwise transform the author's rule specifications into rule software components that operate at the time the reader is perusing an ELM. The transformation takes the same general form as the specification of search criteria for a search engine software program. Each prerequisite Unit ID, for example, is translated into a program statement component testing for the presence of that Unit ID in a list of Unit IDs already read by the reader. If the given Unit ID is present in the list, the test returns a positive result, and if the given Unit ID is not present, the test returns a negative result. The set of all the tests created from the prerequisite Unit IDs, the prerequisite Thread IDs, and the reader level and category becomes a rule software component. Said rule software components use reader and ELM unit characteristics to determine 1) which Thread is used to link a particular reader forward and back between units of presentation; and 2) which Threads are displayed for reader selection, either at the outset of perusal of an ELM, or on completion of perusal of a unit of presentation of the ELM. Said rule software components may also be used to determine which references and other supporting material are presented to a particular reader when the reader selects a Term for definition or other elaboration.

The KTT's 700 rule specifications may take the form of rules as defined in a rule-based expert system such as CLIPS. Each rule contains a set of logical conditions and a set of software actions. When all logical conditions defined in a rule are met, the rule is 'triggered', and carries out its software actions, or 'fires'. Considered without any software context, this process can be essentially that of an ordinary "If . . . Then . . . " programming language construct.

The KTT 700 may be constructed in a compiled-rule embodiment that compiles the author-specified rules into software functions which execute when a reader specifies a link in a presentation Unit. This simple embodiment accomplishes the KTT's 700 purposes without additional supporting software.

In another exemplary embodiment, the KTT 700 is constructed in a rule-based expert system embodiment that uses an inference engine to process author-specified rules, so that a rule of the KTT 700 may fire at any time it is tested, irrespective of the state of execution of the software in general. In other words, the testing of rules is not sequentially performed as if it were specified by a sequence of "If . . . Then . . . " statements. The testing of rules is performed according to the expert system's independently-defined criteria, and not in some linear, programmer-prescribed order. In the rule-based expert-system embodiment, the KTT 700 may incorporate an expert rule processing component such as CLIPS to handle its rule testing and execution. The KTT's 700 rule-based expert-system embodiment offers a much-richer range of effects to an author, at the cost of considerable added complexity in the author's rule definition process.

As an example, the author brings up a Unit from the work itself. In the da Vinci example, the Unit might contain a narrative of da Vinci's entry into Milan in the 1480s. The KTT 700 prompts the author with a series of questions or a form to fill in to identify a point of view (maybe da Vinci, or Ludovico Sforza, his new patron), the locale (Milan, perhaps at Sforza's residence), one or more themes or markers (art, inventions, patrons, change of career, wars, etc.), a time within the narrative (1480) for the scene, and other information such as a list of other people present in the scene.

Once all this information is in place, the KTT 700 may ask the author for a set of categories of reader permissions, associating with each category a set of reader classes eligible to have the scene presented to them. In the da Vinci case, for example, a particular scene might be suitable for college-level readers but not for those whose reading level is below 10th grade.

For each reader class, the KTT 700 then prompts the author for one or more lists of scenes or other components or threads which must have been presented to the reader before the current scene is presented: prerequisite reading in the ELM.

For a reader on da Vinci's life, for example, the reader should have completed the last scene set in Florence with da Vinci preparing to leave, and for a reader of a thread reviewing da Vinci's inventions, the reader should have completed the scene showing him abandoning or completing his previous inventive effort.

For each such list, the KTT 700 may also prompt the author for any qualifiers such as themes or markers indicating other supporting material of value that should be reviewed before the current scene is read.

For a life history thread list, one such marker might be the marker flagging scenes involving the patrons who supported da Vinci in his work. For an invention thread list, another such marker might be the one flagging the wars in which da Vinci's inventions were supposed to play a role.

An Illustration of Rule Implementation and Use in the KTT

HTML tags are primary markup components of HTML used in the formatting and functioning of hypertext pages on the Web. A simple link target embodiment of the KTT's 700 reference linkages may use the 'name="anchorid"' attribute of the '<a>' tag in HTML to mark link targets within a glossary section. In some applications, scoping requirements for some names may require the name to be applicable to a whole section of a document, and not to just the '<a>' tag.

The invention may meet this need using the 'id="anchorid"' attribute of the <div> tag, and building a reference containing individual terms (such as a glossary or an index) with each term's identifier embedded in a <div> tag that marks off the entire term's section. This usage replaces the 'name="anchorid"' attribute in the <a> tag for each term, so there is no net change in complexity of the glossary or index.

Such usage facilitates scoping of custom variables for use in association with each glossary term. The phrase "scoping of custom variables" means that a variable's value used in a Web page can be associated with some component of the page and not with the entire page. For example, the 'name="anchorid"' attribute of an <a> tag associates only with the tag in which it appears. By contrast, if anchorid is used in the 'id="anchorid"' attribute of a <div> tag, that anchorid value associates with the entire section of the page marked off by the <div> ... </div> pair. Therefore, if a link appears somewhere in the <div id="div001"> ... </div> section, the value 'div001' can be accessed and used in JavaScript processing of the link at linking time, and the same processing can be applied for all links in that <div> section.

Another advantage of the <div> approach is that a div can be assigned a stylesheet dynamically in XHTML during loading of the page, so that different versions of the same page section can be displayed or suppressed as required. This facilitates conditional control of content display.

The clearest illustration of this advantage is the creation of multiple glossary entries for a single term to provide alternative displays depending on conditions existing in the narrative being traversed by the reader. Here is an example.

Time in a narrative unfolds the narrative for a reader. A term used in an earlier passage in the narrative may require a restricted definition for readers at that point, but a more-extensive definition for readers at a later point in the story. Consider Michelangelo as a character in Leonardo da Vinci's life. A new reader of an ELM that narrates the story might click on the name 'Michelangelo' when it is first mentioned, and be shown a Glossary entry that simply says that Michelangelo was the Italian Renaissance artist who painting the Sistine ceiling. But a reader who has completed the part of the story that describes the rivalry of Michelangelo and Leonardo da Vinci might click on the name 'Michelangelo' and be shown a Glossary entry that includes a frank description of the physical, economic, and social differences between the two men.

The above is a simple example illustrating temporal dependency in linking to glossary entries. Custom variables in the Web pages allow the ELM to make time comparisons and act accordingly. Each scene Web page carries a time attribute that would specify the time within the flow of the story. Each glossary Web page carries a pair of times that represent beginning and ending dates/times of the applicability of that glossary Web page. The same glossary term could therefore have one, two, three, or more entries depending on whether or not time dependencies exist for that term. Through the application of its rule-based system, the KTT 700 provides temporal control for authors, permitting the author to restrict or expand the reader's access to units, or reorganize the presentation of units, depending on the point in narrative time to which the reader has progressed in a narrative or expositional thread.

With the exception of threads, each of which determines for a reader what will be presented next regardless of what the reader has encountered before, there are no default rules, only the default set of forms and prompts for establishing them. Other such forms and prompts can be defined and derived as needed by builders of instances of the KTT 700.

Finally, an author can create new rules in accordance with conventional methods of rule construction for a rule-based expert system. The KTT 700 may supply one or more embodiments each of which may let an author fill out a simple form to produce a rule, based on drop-down menus of knowledge base 528 fact and rule content.

Rule-based expert systems are well-known in the field of artificial intelligence ("AI"), and in programming computer games, where AI plays the part of the computer 'adversary' or 'ally' of the player.

Each rule of a KTT 700 resembles an "If . . . then . . . " construction in a programming language. An author might want to say for a scene, say, Scene 24 of a work: "If you've read Scene 23 and you're a graduate student or above, I'll display Scene 24 for you. If you haven't read Scene 23 and you're a graduate student, I'll display Scene 23 for you. If you've read Scene 19 and you're a high school graduate or college undergraduate, I'll show you Scene 27. If you haven't read Scene 19 and you're a high school graduate or college undergraduate, I'll show you Scene A1. Everybody else gets Scene 32." In the ongoing example, Scene 24 is a graduate-level discussion of da Vinci's drawing techniques with red crayon, Scene 23 is a similar discussion on da Vinci's experimentation with drawing media, Scene 19 is a general review of da Vinci's drawing style, Scene 27 is a general review of da Vinci's chalk drawings, Scene 32 is a multimedia presentation on da Vinci's art, and Scene A1 is a reminder page suggesting that the reader review the general development of da Vinci's drawing methods as it leads to Scene 19.

The KTT 700 may prompt the author for all these conditions and actions, subsequently translating them into sets of software program statements, compiling, interpreting, or otherwise adapting the statements for their execution in the browser of the presentation computer system, and storing the adapted statements for browser use when the reader attempts to read the ELM.

When the reader finishes reading a scene on a presentation computer system 600 and selects a link to the next scene, the rules associated with the selected scene are processed by the browser. Depending on the actions specified by the applicable rules, the browser then either presents the scene that best matches the rule processing results, or else offers the reader the option of selecting from one or more scenes or units in the ELM. More than one set of rule criteria may be met in some cases, depending on how complex the author has made the rules, so the KTT's 700 rule processing code used by the browser must prioritize and disambiguate the results of the rule processing.

Rule Pseudocode

In a rule-based expert-system embodiment, the ELM's rule code for addressing such dependencies may use a structure along the lines of the following illustrations. The following rules, written as software-independent pseudocode, are assumed to operate in a general inference environment, in which no contextual constraints such as current page and linked page ID are assumed at the time the rules are processed.

```
REPAIR THE FOLLOWING
    RULE-0091
    IF
        Current-Page-ID = "LeoAndMike.html"
        AND Linked-Page-ID = "Glossary_A.html#Michelangelo"
        AND Current-Page-Section-Story-Time ≤ Time-of-Rivalry
    THEN
        LINK-TO("Glossary_A.html#Michelangelo_Div001")
    ENDRULE
    RULE-0092
    IF
        Current-Page-ID = "LeoAndMike.html"
        AND Linked-Page-ID = "Glossary_A.html#Michelangelo"
        AND Current-Page-Section-Story-Time > Time-of-Rivalry
    THEN
        LINK-TO("Glossary_A.html#Michelangelo_Div002")
    ENDRULE
    RULE-0093
    IF
        Current-Page-ID = "LeoAndMike.html"
        AND Linked-Page-ID = "Glossary_A.html#Michelangelo"
        AND Current-Page-Section-Story-Time NOT-AVAILABLE
    THEN
        LINK-TO("Glossary_A.html#Michelangelo_Div000")
    ENDRULE
```

The first rule, RULE-0091, fires when the time of the current point in the story for the reader is less than or equal to the time of the Fall. The current point in the story (Current-Page-Section-Story-Time) is established as any time between the start time for the currently-displayed section of the LeoAndMike.html page and the end time for the same section of the same page. The "Time-of-Rivalry" time marks the point in story time before which the reader can only see a simple glossary entry for Michelangelo ("Glossary_A.html#Michelangelo_Div001"), and after which the reader may be allowed to see a more-complete glossary entry for Michelangelo ("Glossary_A.html#Michelangelo_Div002"). The author codes such time markers as Time-of-Rivalry manually; further enhancements provide an ELM chronology data structure that works in a manner analogous to a PERT chart or similar tool.

The second rule, RULE-0092, fires when the time of the current point in the story for the reader is greater than the time of the Fall. The third rule, RULE-0093, fires when the time of the current point in the story for the reader is not available—in such cases, generic glossary entries may be provided by the author to reveal as much or as little of Michelangelo as wished.

The selection of Michelangelo_Div001, to continue, displays the entry for an innocent Michelangelo, and the entry may in turn contain links to other entries or other pages. Any JavaScript code processing those links may now use the presence of Michelangelo_Div001, as defined in the <div> . . . </div> surrounding that glossary entry, to maintain consideration of the reader's original context of a time before the Fall. Such awareness is not possible using only the anchor in the <a> link. Thus the temporal character of the reader's experience may be better preserved using the <div> approach.

Rules as Written in CLIPS

In the rule-based expert system CLIPS, the pseudocode becomes:

```
(defrule RULE-0091
    (eq Current-Page-ID "LeoAndMike.html")
    (eq Linked-Page-ID "Glossary_A.html#Michelangelo")
    (<= Current-Page-Section-Story-Time Time-of-Rivalry)
=>
    (link-to "Glossary_A.html#Michelangelo_Div001"))
(defrule RULE-0092
    (eq Current-Page-ID "LeoAndMike.html")
    (eq Linked-Page-ID "Glossary_A.html#Michelangelo")
    (> Current-Page-Section-Story-Time Time-of-Rivalry)
=>
    (link-to "Glossary_A.html#Michelangelo_Div002"))
(defrule RULE-0093
    (eq Current-Page-ID "LeoAndMike.html")
    (eq Linked-Page-ID "Glossary_A.html#Michelangelo")
    (isnull Current-Page-Section-Story-Time)
=>
    (link-to "Glossary_A.html#Michelangelo_Div000"))
```

For a CLIPS-type embodiment, the KTT may be constructed so as to compile the CLIPS code in the form above into a global program in a JavaScript or other client-side run-time software platform.

Rules in Compiled Code

The KTT 700 may be constructed in a compiled JavaScript embodiment that may implement rules as JavaScript code fragments. Each page and each possible link selection for that page may have its own set of rules to be tested. The appropriate rule tests are executed when a reader makes a specific link selection on a specific page. Link selection causes the execution of an event-driven function (the onClick event, in JavaScript) containing the set of rule tests for the requested selection. Rules that do not apply to that specific page and link are not tested when the link is selected. Given the specific page and link selected, the rules are simpler in the compiled embodiment than in the expert-system embodiment, because the current page ID is known to be "GenesisOne.html", and the Linked-Page-ID is known to be "Glossary_A.html#Michelangelo". The following is pseudo-JavaScript code, formatted to convey the KTT's 700 method of processing rules in the compiled embodiment:

```
//
// RULE-0091
if (CurrentPageSectionStoryTime ≤ TimeOfRivalry) {
```

```
        linkTo("Glossary_A.html#Michelangelo_Div001");
    }
    // ENDRULE
    //
    // RULE-0092
    if (CurrentPageSectionStoryTime > TimeOfRivalry) {
        linkTo("Glossary_A.html#Michelangelo_Div002");
    }
    // ENDRULE
    //
    // RULE-0093
    if (CurrentPageSectionStoryTime == null) {
        linkTo("Glossary_A.html#Michelangelo_Div000");
    }
    // ENDRULE
    //
```

The end result is the same here as in the previous pseudocode illustration. The primary difference between the two embodiments lies in the greater generality afforded by the rule-based expert-system embodiment, at the cost of added complexity and slower operation. The advantage of the expert-system embodiment lies in its ability to apply global rules regardless of the current page or link being accessed, so that a generic rule may be applied for many pages and links. The advantage of the compiled-code embodiment lies in its compactness, clarity, and speed.

The KTT's Links Between Units

A conventional hypertext link in the HTML sense, implemented using the <a> tag, contains both a link to a presentation Unit, or page, to be loaded and a displayed text that identifies 1) the link itself, and 2) the function or purpose of the link. An example might be:

<a href="NewPage.html">Go To New Page</a> where the reader sees the text "Go To New Page", and selecting the text causes the browser to load the page named "NewPage.html". The KTT 700 eliminates the use of 1) from most link processing altogether, instead treating each link as a variable identified functionally by its displayed text.

Selecting the link invokes one or more software functions which evaluate the conditions applicable at the point of the selection (current page or Unit, identity of reader, link selected) and execute a linking operation to a new page determined by the evaluation. Therefore, a hypertext link stored conventionally at the location selected by the reader may or may not be the same as the link actually applied.

The KTT 700 may accomplish its linking process in an HTML/JavaScript setting by using author rule specifications to construct code to be executed when the reader selects a link. Following is an example of the KTT's 700 hypertext reference (href) code in HTML, showing the displayed text for the link ("To Next"), the function ("lnkSF") called when the reader selects the link display, a function ("chkThr") called to display in the window status bar the explanation of the displayed link for the reader, and the default link value ("Andrew-49-01-01.htm") to be used if lnkSF does not return a usable link for any reason:

```
<a href="Andrew-49-01-01.htm"
onClick="this.href=lnkSF(this.href,this.text); return true;"
onMouseOver="window.status=chkThr('Next scene in current
thread',this.text);
return true;">
To Next
</a>
```

The above implementation of the KTT's linking process is presented here as an example of such implementations. The use of other client-side and client-server languages and logic may be employed to yield the KTT's 700 effects in different embodiments.

The Reader Context of the KTT

The KTT 700 may produce both context-free and context-dependent embodiments of its ELM, or either the context-free ELM or the context-dependent ELM independently. In the context-free embodiment, the KTT 700 need not retain any information concerning the reader and the reader's previous accesses to the ELM. A reader of a context-free ELM may access freely any page or other unit of the ELM without restriction. In the context-free embodiment, the only constraints to access are the links among the ELM's pages, and the reader is free to access any page in any order.

In the KTT's 700 context-dependent embodiment, two types of information may be retained and used during a reader's access to the ELM. The first is the set of characteristics that apply for a particular reader. A registration or data-gathering process of the KTT 700 collects information concerning the reader, including an identifying name, an access authentication phrase or password, a list of permissions or other constraints on scope of access, and a set of reader qualifications and abilities. This set of characteristics establishes criteria to be applied by the KTT's 700 rule processing in granting access to Threads and Units.

The KTT's 700 second type of contextual information comprises the set of Units a reader has already viewed, together with a number of visits to each Unit. As a reader traverses a Thread, each Unit the reader views in the Thread is identified and its identifier stored in a list for the reader, or its count of visits incremented. When the KTT's 700 rule processing is applied at the time the reader selects a link, the rules applicable to the current page and the reader's link selection may apply the reader's list of Units already viewed and the number of viewings in order to choose an appropriate response to the reader's selection.

The KTT's 700 context-dependent embodiment may operate with one or both types of information. As with temporal dependencies, the KTT 700 provides, through its rule-base system, a means of control for authors based on reader context, permitting the author to restrict or expand the reader's access to units, or reorganize the presentation of units, depending on access to and processing of a reader's personal or organizational background or context.

Use of the KTT as a Programmed-Learning Tool

An author may organize the KTT's 700 Units and links in such a way as to create an ELM that functions as a programmed-learning entity. The displayed information for any link may be provided by the author as an answer to a question in the text of a Unit. Several such links may be placed together to offer the reader a menu-style choice as in a multiple-choice examination or questionnaire. When the reader selects a link displaying the reader's preferred response to the question, the resulting response of the ELM depends on the author's desired treatment of that response. The author may use a context-dependent embodiment of the KTT 700 using rules that check a reader's previously-viewed Units and the reader's characteristics. In such an embodiment, the author may then direct different readers to different Units as desired, thereby customizing the learning process to the needs and responses of each reader.

In summary, the KTT 700 provides conditional control for authors, permitting the author to restrict or expand the reader's access to units, or reorganize the presentation of units, depending on conditions external to the ELM itself, including but not restricted to the reader's progress in one or more narrative or expositional threads, the real-world calendar date and current time of the reading taking place, or a reader's personal or organizational background or context.

Operation of the KTT

The KTT's 700 overall operation is summarized in FIG. 9. The KTT 700 uses as its primary input an author's source file(s) 302 in electronic form. The KTT 700 breaks down and stores the input text(s) as Units using a text breakdown and text unit storage process 102, as described further below with reference to FIGS. 10 and 11. The KTT 700 constructs and stores Threads defined by the author using a thread construction and storage process 104, as described further below with reference to FIG. 12. The KTT groups Units into Components and storing the resulting definitions using a unit grouping and component storage process 106, as described further below with reference to FIG. 13. The KTT constructs and stores presentation rules for the Units using a presentation rule construction and storage process 108, as described further below with reference to FIG. 14. The KTT 700 links all reference usages in each Unit using a unit linking process 110, as described further below with reference to FIG. 15. The KTT converts all Units to hypertext pages using a conversion to hypertext pages process 112, and packages the pages using an ELM packaging process 114 into an ELM 422, as described further below with reference to FIGS. 16-18, and distributes the ELM 422 using an ELM distribution process 116.

The following step descriptions reflect the sequence of steps described above, with overlap and repetition shown as required by the KTT's 700 design.

Breaking a Text into Stored Units of Presentation and Reference

The KTT's 700 first step 102 takes place when an author or publisher organizes a set of texts and other material for electronic storage and organization in the KTT's 700 database 528. With reference to FIGS. 10 and 11, the author separates, using an author unit text file separation process 118, each Unit source file 304 into a set of one or more base Unit text files 306. The author then specifies attributes of the resulting Units using an author unit attribute specification process 120, storing the attributes in the Unit Processing Tables 202, the Marker Tables 210, and the Theme Table 214. The author also stores, using a unit storage process 122, the Unit text itself in files 308, or in the database 528, and a set of Unit definitions, one per Unit, in the Unit Table 204. The author also initiates the process of preparing access rules for Unit presentation using an author rule specification process 124, storing said rules in the Unit Rules table 212.

The KTT 700 distinguishes between Units of presentation and Units of reference. The KTT's 700 Units of presentation comprise the set of Units to be displayed to a reader in one or more defined sequences. The KTT's 700 Units of reference comprise the set of Units to be used in support of the Units of presentation as reference material, such as sidebar articles, notes, glossaries, dictionaries, illustrations, expositions, animations, tabular data, indices, tables of contents, cinematic clips, audio files, and other supporting materials.

Units of reference require additional processing shown in FIG. 11. The preparation of a Unit of reference using an author reference unit presentation process 126 as a text file 310 and the storage of Unit attributes in the Unit Processing Table 202 is done in the same way as for Units of presentation using the reference source materials 406. In addition, a Unit of reference may contain list or tabular structure, as in a table, a glossary or dictionary, and for such references the author provides reference tabulation definitions 408 and lists of terms and their definitions to be stored in Tabulation Definitions Tables 226, Term Table 228, Reference Unit Table 204*b*, and Term Usage Table 230 using a reference unit database load process 128. The KTT 700 compiles the tabulation definitions, using a tabular reference unit compilation process 130, into tabular reference unit text files 312, for later inclusion in other Units if needed.

The result of step 102 is the breaking of a text and related materials into Units, the derivation of reference Unit structure, and the derivation of unit attribute and access information for use in later processing.

Preparing and Storing Sequences of Presentation

The KTT 700 then may establish an initial set of sequences, called Threads in step 104, in which Units of presentation are to be presented to readers. With reference to FIG. 12 the author initially determines separately a set of themes and a set of markers to be used by the KTT 700 to collect and sequence Units into Threads. A theme is usually a characteristic of multiple Units, together with one or more sequencing criteria, that develops a comprehensible and engaging body of information in a reader's mind. For a piece of fiction, for example, a theme might comprise a point-of-view character's Units and a time sequence in which those Units are to be read. A marker is a term, phrase, or other element of interest that allows collection of Units into a set, regardless of their sequence. For example, a marker might be any of a set of names for a geographical area, and the KTT would later use the marker to grant a reader easy access to all references to that area without traversing irrelevant information.

In optional steps not shown, the KTT 700 may prompt the author for thematic and keyword information of importance in the intended ELM, storing themes in the Theme Table 214 and markers in the Marker Tables 210. As shown in FIG. 12, using these tables along with Unit Table 204 and Component Tables 216, the KTT 700 prompts the author for unit thread attributes 410 having one or more sequences of presentation of subsets of the Units of presentation, using a conventional graphical user interface, so that the author specifies, using an author unit thread specification process 132, and constructs, using an author thread construction process 134, a set of Thread definitions 412, which the KTT 700 loads, using a thread database load process 136, into the Thread tables 232*a*, 232*b*, and 232*c*. The KTT 700 also examines the Unit Table 204, Theme Table 214, and Marker Tables 210 information supplied by the author, and generates sequences (called Traces) based on the contents of these three sets of tables. The KTT 700 stores the generated sequences in its Threads tables 232*a*, 232*b*, and 232*c*.

In an optional step not shown, the KTT 700 may prompt the author for reader-related criteria that associate each specific reader level and expectation with sets of Threads suitable for that specific level and focus of readership. The resulting reader-related criteria are stored in the KKT's 700 Unit Rules table 212 (see FIG. 10) as facts for use in rule processing.

Grouping the Units of Presentation and Reference into Stored Components of Presentation Next, in step 106, the KTT 700 prompts the author to define sets of Units of presentation and reference, in order to treat such sets as collective entities. As shown in FIG. 13, using the Unit Tables 204 for all Units of presentation and reference, the author prepares, using an author component preparation process 138, Component definitions 414. Each such Component contains one or more Units, one or more smaller Components, and/or a mixture of Units and smaller Components. The author may identify components according to the needs of the final ELM. For example, an ELM's largest components might be identified as parts, with each part consisting of one or more components identified as chapters, with each chapter consisting of one or more components identified as sections, each of which contains one or more units, The KTT 700 stores, using a component database load process 140, the author's Component definitions and associations in its Component tables 216a, 216b, 216c.

At this stage the author may construct additional Threads, as in the previous step, comprised of Components and Units in combination. A given ELM might then have multiple orders of presentation defined for it at a part, chapter, section, unit, or mixed level for different readers or classes of readers.

Preparing and Storing Rules of Presentation

In its next step 108, the KTT 700 prompts the author to set up rules defining the reader's use of Units and Threads in the finished ELM. As shown in FIG. 14, the KTT 700 provides author access via a graphical user interface to the Unit Table 204, the Component Tables 216a, b, and c, the Unit Processing Tables 202, the Theme Table 214, the Marker Tables 210, and the reader characteristics 416 prepared earlier by the author. The KTT 700 prompts the author to add, edit, or otherwise change the basic set of rules for each presentation Unit to specify, using an author rule specification process 142, a final set of rules of presentation. The KTT 700 stores in process 142 the resulting rules of presentation constructed in both stages in its Unit Rules Table 212.

Locating and Linking All Usages of Each Unit of Reference

In its next step 110, the KTT 700 collects all the reference terms, where reference terms include phrases, symbols, sections, portions, and other usages as explained in the reference Units, searches out all occurrences of each such usage in every presentation Unit and reference Unit, and inserts a link to the reference Unit explaining the reference term usage in every location in every Unit where the usage occurs. As shown in FIG. 15, the KTT 700 uses as input the stored Unit text file 308, the Unit Tables, the Tabulation Definition Tables 226, and the Term Usage Table 230 to insert links in the text file using a unit file link insertion process 144 to produce a linked Unit text file 316. The KTT 700 constructs its links within a Unit to other Units such that at the time a reader selects a link, the KTT 700 tests any rules in its rule base that are applicable to links into other Units, and takes actions specified in any satisfied rule.

The KTT's 700 links to other Units may direct the reader to the other Unit as a whole, to some section or portion of the other Unit, or to a single Term in the other Unit. Any Unit may contain multiple hypertext link targets (also referred to herein as anchors). The KTT 700 applies structural information for such a Unit from its Tabulations tables to determine how and where to place its link targets.

Converting Units to Electronic Document Pages

In step 112, the KTT 700 then compiles all of its linked Units into hypertext form such as HTML, XHTML, and/or other Web page markup format. An exemplary compilation process, including creating the links for the Threads, is shown in FIG. 16. Using a unit link generation process 146, links are generated from the Thread Tables 232a-c connecting each Unit in one or more Threads, collects, using a unit file parameters collection process 148, compilation parameters 418 from its link generation process 146, Unit Table 204, Marker Tables 210, Theme Table 214, and Tabulation Definition Table 226, and constructs, using a unit processing record process 150, entries in the Unit Processing Tables 202 for each Unit.

With reference to FIG. 17, in its compiled-rule embodiment, the KTT 700 then may compile, using a unit rule compilation process 152, all Unit rules for each Unit from the Unit rules table 212, producing compiled Unit rules 420 as an executable script or code element. (This step is omitted in the ELM expert-system rule-based embodiment, since the inference engine for such a system is packaged and distributed with the ELM.) Using the entries in Unit Processing Tables 202, the linked Unit text files 314a, 314b, 314c, and the compiled Unit rules 420, the KTT 700 compiles, using an ELM compilation process 154, the entire ELM 422. Referring to FIG. 18, in the compilation process as outlined in the Unit Processing Table 202, the KTT 700 combines, using a generate Unit hypertext page process 156, header 322, linked Unit text file 316, footer 324, and Compiled Unit Rules 420 for each Unit into a valid conventional Web page document or other form of electronic document page 424 contained in the compiled ELM 422.

The KTT 700 may use conventional stylesheets and formatting processes to bring the appearance of the output Web page document as close as possible to the appearance of a simple, conventional, printed page, thereby supporting improved reader immersion in the material being presented through the reduction of visible distractions.

The KTT 700 may store the rules derived for each presentation Unit as software references or code inserted into the Web page document.

In a compilation embodiment of the KTT 700, the step 112 may be performed during a compilation process before the packaging 114 of the final ELM, allowing an author or publisher to simplify the structure and operation of the product ELM.

In a dynamic embodiment of the KTT 700, the step 112 may instead be accomplished by passing the header, body, and rule information along in the delivered ELM along with Web page generation code in JavaScript or other such language to perform the page assembly at the time the reader links to each page. In the dynamic embodiment, the KTT 700 may reduce storage space for its pages at the expense of more-complex execution of programs at the reader's system. The dynamic embodiment may be implemented using DHTML, PHP, and other conventional software means.

In an instance of the client-only embodiment, during the step 112, the KTT 700 may collect all Units, stylesheets, executable page-based code such as JavaScript, text documents, and other supporting materials such as images, audio clips, and similar elements into a single set of folders supporting the KTT's 700 links among its elements. The output of the step 112 for the client-only embodiment is the standalone ELM to be stored in its entirety and used on the reader's system.

In an instance of the client-server embodiment, during the step 112, the KTT 700 may collect all Units, stylesheets, executable page-based code such as JavaScript, text documents, and other supporting materials such as images, audio clips, and similar elements into a set of folders to be stored in the reader's client system for use, and a set of folders to be stored in one or more server systems for retrieval during reading to the reader's client system.

Packaging the ELM

In its packaging step 114 the KTT 700 may combine the ELM with additional elements that provide installation, formatting, and presentation information specific to a particular software and hardware platform used by a reader. Such information accommodates the operation of the ELM on different devices and software platforms used by different readers. Each device type and its software components require different treatment due to memory limitations, software availability and compatibility, display and presentation characteristics, and user input differences.

For example, an ELM reader may use a desktop PC, a laptop computer, a handheld computer, a personal digital assistant (PDA), a handheld game computer such as a Sony PSP, or a wireless telephone with a working Web page browser program. One device may allow multiple windows, another may not. The display width on a wireless telephone is a few tens of characters in a fixed format, while the display width on a desktop computer may easily exceed a hundred characters. A wireless telephone display offers limited graphics capability, while a desktop may be designed to handle the most complex and sophisticated dynamic graphics. The KTT 700 is designed to accommodate such differences in the ELMs it produces.

ELM Transfer

In its transfer step 116 the KTT 700 uses conventional file and folder transfer processing methods to make the ELM available to readers. Said processing methods include flash memory plug-in and use, portable storage media attachment and use, file transfer over physical connections, and wireless file transfer.

Thread Presentation and Selection

The KTT 700 produces as a part of its ELM 422 one or more menu pages containing lists of threads available for reader selection. Each thread listed is displayed to the reader with a description of its content and any potential reader prerequisites. If a reader has registered qualifications with the ELM, then the ELM's menu pages show only those threads for which the reader is qualified.

Both Threads, constructed by the author directly, and Traces, constructed by the KTT 700 using author parameters, are presented to the reader as selectable threads wherever reader qualifications allow.

Page Presentation to the Reader

Once the reader has selected a thread for presentation, the KTT 700 displays the first page in the selected thread. See FIG. 19 for a representative embodiment of page format. Many similar page formats in a wide range of embodiments are possible in the KTT 700. The reader's screen 5 in this representative embodiment shows a presentation page 800, flanked by a reference article page 820 and a glossary page 840. Only the presentation page 800 is fully visible. In a small-screen embodiment, one or both of the flanking pages might not be shown. In FIG. 20, the reference article page 820 is visible, as when a reader decides to peruse it during the reading of the presentation page. In all cases, the flanking pages 820, 840 are presented to the reader concurrently with the presentation page 800, either in overlapped form as shown, in non-overlapped form showing the complete content of all pages, or in stacked form that makes non-visible pages in the stack visible with a single selection action such as a mouse or key click, for example.

In a multiple-presentation embodiment not shown, two or more presentation pages 800 may be displayed in adjacent windows or frames to provide for comparison of texts or other content. Flanking pages 820, 840 may be presented the same way in the multiple-presentation embodiment as in other embodiments.

The text of the presentation page 800 is formatted using stylesheets and other conventional methods to resemble printed page form as much as possible. FIG. 21 shows a conventional method of displaying textual links 605, 607 to a reader, openly and clearly. Referring to FIG. 22, the KTT's 700 method suppresses all visible trace of the textual links except the shift in mouse icon appearance 611 during mouseover, so the reader can read without visual distraction, and with maximum familiarity with the printed form.

The KTT 700 presents "Next" and "Previous" labeled links to the reader to choose from after reading the displayed page. The KTT 700 optionally presents added links labeled with their purposes as specified by the author. The reader may select "Next", "Previous", or any of the other links shown.

In a textbook ELM context, another link might be titled "Detail", where a reader can find an expanded series of pages elaborating the content of the current page. Still another link might be titled "Background", where a reader can find historical or contextual information concerning the content of the currently-displayed page. A further link might be labeled "For Nonspecialists", where the reader can find simplified or summary information concerning the current page content.

In a literary ELM context such as that of a novel, another link might be titled with the name of a secondary character for the current page, allowing a reader to follow a thread.

The KTT 700 allows the reader to exploit conventional browser controls (forward, back, reload, stop) to navigate to and from the pages displayed.

In the context-dependent embodiments, information identifying each page or other Component of the ELM that may be presented to a reader is identified and stored, at the time the page is presented. When the reader selects a subsequent page to be displayed, the rules bound to the subsequent page may be processed to determine whether the input conditions (i.e., the reader and the pages already presented) meet the prerequisites for the selected page. A subsequent page appropriate for the rules satisfied by the input conditions is linked and presented.

Display Navigation

Referring to FIGS. 23-25, the KTT 700 simplifies and facilitates the reader's movement between a narrative presentation page 800, a reference article page 820, and a glossary page 840. On the left and right sides of the text of the narrative page 800, the KTT inserts vertical bars 802 and 803 respectively. The vertical bars 802, 803 are termed herein "Z-bars", since they exploit the use of the Z-axis, or depth, of the viewing area. Initially, in one embodiment, the KTT 700 displays the ELM with narrative page 800 overlapping or covering both flanking pages 820, 840. If the reader selects Z-bar 803 on narrative page 800, the KTT's 700 software brings glossary page 840 to the foreground to make it readable, overlapping or covering narrative page 800 and reference page 820, for example, as shown in FIG. 24. If the reader selects Z-bar 802 on narrative page 800, the KTT's 700 software brings reference page 820 to the foreground to make it readable, overlapping or covering narrative page 800 and glossary page 840, for example, as shown in FIG. 25. The Z-bars may be elongated vertical structures, horizontal structures, and/or any other shaped portion or graphical area selectable by a user through a user interface device.

The KTT 700 operates similarly when glossary page 840 is overlapping as shown in FIG. 24. If the reader selects Z-bar 841 on glossary page 840, the KTT's 700 software brings narrative page 800 to the foreground to make it readable, overlapping or covering both reference page 820 and glossary page 840, for example, as shown in FIG. 23. If the reader selects Z-bar 842 on glossary page 840, the KTT's 700 software brings reference page 820 to the foreground or forefront to make it readable, overlapping or covering narrative page 800 and glossary page 840, for example, as shown in FIG. 25.

Finally, the KTT 700 operates similarly when reference page 820 is overlapping as shown in FIG. 25. If the reader selects Z-bar 821 on reference page 820, the KTT's 700 software brings narrative page 800 to the foreground to make it readable, overlapping or covering both reference page 820 and glossary page 840 as shown in FIG. 23. If the reader selects Z-bar 823 on reference page 820, the KTT's 700 software brings glossary page 840 to the foreground to make it readable, overlapping or covering narrative page 800 and reference page 820, for example, as shown in FIG. 24.

In the ELM, each presentation page 800, reference article page 820, and glossary page 840 has its own window, so that the reader may select a new page in one ELM window without affecting the contents or context of any other ELM window.

An exemplary expanded Z-bar embodiment is shown in FIG. 26. The use of Z-bars to switch quickly from window to window in a multiple window presentation may be expanded to include two or more Z-bars in each window in different positions and orientations suggesting the positions and orientations of the windows to which each Z-bar refers. Some of the usages are explicitly illustrated in FIG. 26, but others are contemplated. Z-bar 802*a* on window 800 switches the reader to window 820*a*, while the adjacent Z-bar 802*b* on window 800 switches the reader to window 820*b*, for example. Likewise, the bottom Z-bar 805 on window 800 switches the reader to window 850, for example. Also, the bottom Z-bars 851, 853 on window 850 switch the reader to windows 800, 830, respectively, for example. Thus the reader can change windows accurately and rapidly in a confined screen space, even if all windows are stacked directly atop one another on the screen, as is the case for most handheld computing devices.

Referring to FIG. 27, when the ELM is installed on a presentation computing system with a small screen 6 such as a handheld computer or cellular telephone, for example, only one window can be practically made visible at a time. The use of the Z-bars simplifies movement between overlapping or stacked windows 800, 820, 840. In such a situation, the Z-bars 802, 803, 823, 821, 842, 843 are the fastest way for the reader to flip from one of the three stacked windows 800, 820, 840 to another, as shown in FIG. 28.

In the ELM, the Z-bar embodiments use a circular or loop pattern to assist the reader in navigating among a set of displays. Referring to FIG. 29, the left Z-bar 802 on a starting window 800 selects the next window 820 in one direction around a loop continuing through window 840, returning to starting window 800 via left Z-bars 823, 843. Referring to FIG. 30, the right Z-bar 803 on the starting window 800 selects the next window 840 in the opposite direction around a loop continuing through window 820, returning to starting window 800 via right Z-bars 842, 821. In this way the reader can quickly learn the sequence of windows to be presented by repeated use of the Z-bars.

In the expanded Z-bar embodiment shown in FIG. 26, similar looping sequences may be defined for four or more windows or screen presentations in any direction.

CONCLUSIONS

In all of its embodiments and in all features provided by combining its embodiments, the KTT 700 combines software and digital data elements derived from documents into structures and programs which reinforce validity and relevance of the material presented, maintain the reader's immersion in the material, focus and guide the reader through orderly sequencings of the material, stimulate the reader with its presentations, support the reader's rapid acquisition of knowledge details, offer the reader a profusion of sequences of presentation of the material, and facilitate and simplify the work of authors and editors in preparing material for readers. The KTT's 700 apparatus and method eliminate the overload and distraction a reader experiences when using conventional Web pages in a multiple-document or Internet-wide linkage, while enriching the reader's rate and depth of intake of knowledge well beyond what is possible with printed works. The KTT 700 also provides authors with methods and means for converting, constructing, and maintaining electronic works easily and completely.

The KTT 700 helps open the way to meeting deeply-felt educational needs worldwide. Once an author develops educational content, it can be disseminated with the speed of the Internet, installed on a wide range of presentation devices most convenient and best-suited for diverse groups of readers and their environments, and assimilated by learners of widely-divergent backgrounds, with the highest rates of absorption and degree of accuracy. An educator can create an entire educational program, together with its means of presentation, to fit in the palm of one hand.

GLOSSARY OF TERMS

Component—a Unit, a collection of Units, or a collection of other Components. A chapter can be considered a Component. A section of a chapter is also a Component.

ELM—an electronic literary macramé—a body of knowledge structured for immersive learning—comprising a complete output of the KTT. An ELM contains Presentation Units, Reference Units, Threads, and Presentation Rules.

Fires, Firing—see Rule.

Marker—an identifiable element in a Unit, usable in creating Traces of Units for presentation purposes. An example of a Marker might be the name of a city. A Trace for that name would present to a reader all the Units containing references to the city name.

Presentation Rule—a Rule stored in a Presentation Unit.

Presentation Unit, unit of presentation—the basic Unit of the ELM's Threads, presented to a reader in an order determined by the Thread and the Presentation Rules. A scene is a form of Presentation Unit.

Reference Unit, unit of reference—a Unit used primarily to provide a reader with expository information concerning some Term, Unit, or aspect of an ELM.

Rule—a logical expression stored in a Unit and tested to determine whether or not the Unit may be presented to a reader based on the results of the expression's tests. A Rule also determines which Unit is to be presented to the reader based on the expression's test results. Rules are tested when a Unit is first retrieved for a reader, when the reader initiates an action such as selection of a link, or when the Unit is replaced by another Unit. Each test of a rule tests all of the rule's logical conditions as defined by the author. When all logical conditions defined in a rule are met, the rule is 'triggered', and carries out its software actions, or 'fires'.

Tabulation—a definition of structure and content for some aspect or segment of a Unit. A Term definition, for example, may appear in a glossary list within a Reference Unit. A Tabulation may be used to construct a matrix of values, terms, or definitions as needed, to be inserted in a Unit.

Term—a word, phrase, or other unit of expression for which an author requires a Reference Unit explanation, definition, or exposition.

Thread—a series of Units to be presented to a reader in a sequence determined by an author or a process defined by the author. The author may explicitly sequence a set of Units, or the author may incorporate in the Units a timeline or other ordering to be used in the sequencing. Most Threads are used to sequence Presentation Units, Trac—a Thread of Units constructed based solely on criteria furnished by an author, without detailed author participation in the construction process.

Trigger, Triggering—see Rule.

Unit—a single lesson, passage, or scene established by an author to be presented to a reader. A Unit is short enough to be presented in no more than a brief interval of viewing, listening, or otherwise making directly available, so that the reader's attention is unlikely to be diverted during the perusal of the Unit. Presentation Units and Reference Units are classes of Units in the present invention.

What is claimed is:

1. A method for facilitating window navigation on an electronic display, comprising the steps of:
rendering simultaneously at least three overlapping windows, including a foreground window and two background windows, wherein said foreground window overlaps at least one or more background windows;
rendering at least one elongated strip on each one of two opposing edges of the foreground window wherein the strips are selectable by a user through a user interface device;
associating one strip of the foreground window with one background window and associating the other strip of the foreground window with the other background window;
in a single operation, operating the user interface to select one of the strips on one of the edges of the foreground window to immediately transition the background window associated with the selected strip to the forefront of the electronic display; and
displaying the background window associated with the selected strip on the forefront of the electronic display and displaying the foreground window associated with the selected strip in the background of the electronic display.

2. The method of claim 1 further comprising the steps of:
rendering at least one elongated strip on each one of two opposing edges of a first one of the background windows wherein the strips are selectable by a user through a user interface device;
associating one strip rendered on the first background window with the foreground window and associating the other strip on the first background window with the second background window wherein the strips are configured to transition the foreground window and second background window to the forefront of the electronic display upon selection of the respective strip by the user through the user interface device;
rendering at least one elongated strip on each one of two opposing edges of the second background window wherein the strips are selectable by a user through a user interface device; and
associating one strip rendered in the second background window with the foreground window and associating the other strip of the second background window with the first background window wherein the strips on the second background window are configured to transition the foreground and first background windows to the forefront of the electronic display upon selection of the respective strip by the user through the user interface device.

3. The method of claim 2 wherein the foreground and background windows are rendered as a result of a compilation of an electronic literary macrame and wherein the first window is a narrative window, the second window is a reference window and the third window is a glossary window.

4. The method of claim 2 wherein each of the elongated strips is a selected from the group consisting of a vertical elongated strip and a horizontal elongated strip and wherein each of the strips are rendered on opposing sides of textual content rendered in each respective window.

5. The method of claim 2 wherein the foreground and background windows are rendered as overlapping wherein the background windows are disposed toward opposing sides of the foreground window.

6. The method of claim 5 wherein:
one of the opposing elongated strips of the foreground window associated with the first background window is disposed toward the location of the first background window relative to one opposing elongated strip associated with the second background window;
one of the opposing elongated strips of the first background window associated with the second background window is disposed toward the second background window relative to one opposing elongated strip associated with the foreground window; and
one of the opposing elongated strips of the second background window associated with the first background window is disposed toward the first background window relative to one opposing elongated strip associated with the foreground window.

7. The method of claim 5 wherein the foreground and background windows are rendered as stacked.

8. The method of claim 1 wherein the foreground window overlaps portions of the background windows.

9. The method of claim 8 wherein each background window has strips and the foreground window exposes at least one strip of one background window.

10. The method of claim 8 wherein the foreground window displays all of its elongated strips and exposes at least one strip of each background window.

11. The method of claim 1 wherein the foreground window fully covers all background windows.

12. The method of claim 1 wherein the display renders three or more background windows and one foreground window has at least one strip associated with each background window for bringing the associated background window to the foreground.

13. An apparatus for facilitating window navigation on an electronic device, comprising:
a user interface device;
an electronic display device including a screen;
a control device including at least one processor wherein the control device is configured to communicate with the electronic display device and the user input interface device;
data storage means for storing program instructions that, when implemented by the control device, operate said control device to:
render simultaneously on the screen a plurality of overlapping windows including at least a narrative window, a reference window, and a glossary window, wherein one of said windows is in the foreground of the electronic display and the other windows are in the background of the electronic display;
render on the screen a pair of elongated strips on opposing sides of the narrative window wherein the strips are selectable by a user through the user interface device;
associate one strip of the pair of strips of the narrative window with the reference window and the other strip of the pair of strips of the narrative window with the glossary window and in a single operation of the user interface device to select one of the strips, immediately transition to the foreground the reference or glossary window associated with the strip operated on by the user interface device and display the window associated with the selected strip on the foreground of the electronic display and move the narrative window to the background of the electronic display;

render on the screen a pair of elongated strips on opposing sides of the reference window wherein the strips are selectable by a user through a user interface device;

associate one strip of the pair of strips of the reference window with the narrative window and the other strip of the pair of strips of the reference window with the glossary window and in a single operation of the user interface device to select one of the strips, immediately transition to the foreground the reference or glossary window associated with the strip operated on by the user interface device and display the window associated with the selected strip on the foreground of the electronic display and move the reference window to the background of the electronic display;

render on the screen a pair of elongated strips on opposing sides of the glossary window wherein the strips are selectable by a user through a user interface device; and associate one strip of the pair of strips of the glossary window with the narrative window and the other strip of the pair of strips of the glossary window with the reference window and in a single operation of the user interface device to select one of the strips, immediately transition to the foreground the narrative or reference window associated with the strip operated on by the user interface device and display the narrative or reference window associated with the selected strip in the foreground of the electronic display and move the glossary window to the background of the electronic display.

14. The apparatus of claim 13 wherein the user interface device is selected from the group consisting of a button, a keypad, a keyboard, a dial, a click wheel, a mouse, a trackball, a touch screen, a capacitive sensing mechanism, and a multi-touch capacitive sensing mechanism.

15. The apparatus of claim 13 wherein the elongated strips are vertical elongated strips disposed toward opposing left and right side portions of each respective window.

16. The apparatus of claim 13 wherein the elongated strips are horizontal elongated strips disposed toward opposing top and bottom portions of each respective window.

17. The apparatus of claim 13 wherein the program instructions, when implemented by the control device, are further configured to render a plurality of additional windows wherein each window includes at least one pair of opposing elongated strips and wherein each strip is associated with a window and wherein selection by a user, through a user interface device, of a series of strips causes a looped progression of window transitions.

18. The method of claim 13 wherein the strips are disposed at lateral or vertical edges of the windows.

19. The apparatus of claim 13 wherein the foreground window overlaps portions of the background windows.

20. The apparatus of claim 19 wherein each background window has strips and the foreground exposes at least one strip of one background window.

21. The apparatus of claim 19 wherein the foreground window displays all of elongated strips and exposes at least one strip of each background window.

22. The apparatus of claim 20 wherein the foreground window fully overlaps all background windows.

23. The apparatus of claim 13 wherein the display renders three or more background windows and one foreground window has at least one strip associated with each background window for bringing the associated background window to the foreground.

24. A method for facilitating window navigation on an electronic display, comprising the steps of:

rendering simultaneously and displaying simultaneously on an electronic display two or more overlapping windows including a presentation page in the foreground of the electronic display and one or more flanking pages in the background of the electronic display, each flanking page at least partially overlapped by another page;

rendering one or more strips on the edges of each page including the presentation page and the one or more flanking pages;

associating each strip of each edge of the presentation page with one of said one or more flanking pages;

in response to a single operation, operating a user interface device to select a strip on the presentation page to immediately transition the selected background window to the foreground of the electronic display; and in response to the selection of the strip on the presentation page, displaying on the electronic display the selected background window associated with the selected strip of the presentation page on the foreground of the electronic display and the presentation page with the selected strip on the background of the electronic display.

25. The method of claim 24 further comprising rendering in the displayed portions of said flanking pages said strips of said flanking pages associated with the presentation page.

26. The method of claim 24 wherein said overlapping pages are stacked on top of each other to obscure the strips of one more flanking pages but expose all the strips of the presentation page.

27. The method of claim 24 wherein the presentation page overlaps portions of each flanking page.

28. The method of claim 27 wherein each flanking page has strips and the presentation page exposes at least one strip of one flanking page.

29. The method of claim 27 wherein the presentation page displays all of its elongated strips and exposes at least one strip of each flanking page.

30. The method of claim 24 wherein the display renders three or more flanking pages and one presentation page has at least one strip associated with each flanking page for bringing the associated flanking page to the foreground.

31. The method of claim 24 wherein the strips are disposed at lateral or vertical edges of the pages.

32. The method of claim 24 wherein the foreground window fully overlaps all background windows.

\* \* \* \* \*

UNITED STATES PATENT AND TRADEMARK OFFICE
CERTIFICATE OF CORRECTION

PATENT NO.        : 8,689,134 B2                              Page 1 of 1
APPLICATION NO.   : 13/053940
DATED             : April 1, 2014
INVENTOR(S)       : D. Paxson It is certified that error appears in the above-identified patent and that said Letters Patent is hereby corrected as shown below:

In the Claims

| Column | Line | Error |
|--------|------|-------|
| 31 | 66 | In Claim 4, "strips is a selected from" should read --strips is selected from-- |

Signed and Sealed this
Ninth Day of May, 2017

Michelle K. Lee
*Director of the United States Patent and Trademark Office*